(12) United States Patent
Tsuchiya et al.

(10) Patent No.: US 7,856,255 B2
(45) Date of Patent: Dec. 21, 2010

(54) ELECTRONIC APPARATUS

(75) Inventors: Ryo Tsuchiya, Tokyo (JP); Hisaya Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 12/072,266

(22) Filed: Feb. 25, 2008

(65) Prior Publication Data

US 2008/0207281 A1      Aug. 28, 2008

(30) Foreign Application Priority Data

Feb. 28, 2007  (JP) ............................. 2007-048482

(51) Int. Cl.
*H04Q 7/32*   (2006.01)
(52) U.S. Cl. .............. 455/575.1; 455/550.1; 455/556.1; 455/90.3; 455/566; 379/428.01; 379/433.01; 379/433.06; 379/440; 200/4; 200/6 R; 200/179; 200/11 TW; 345/184; 345/169
(58) Field of Classification Search ... 455/575.1–575.8, 455/90.1–90.3, 556.1, 556.2, 557, 550.1; 379/428.01, 433.01, 433.06, 440; 200/4, 200/6 R, 179, 11 TW; D14/137, 138, 152, D14/153; 345/184, 169
See application file for complete search history.

(56) References Cited

U.S. PATENT DOCUMENTS 6,892,083 B2 *   5/2005   Shostak ................... 455/575.6
7,091,430 B1 *   8/2006   Haizima et al. ............ 200/6 A
7,400,915 B2 *   7/2008   Wong et al. ............... 455/575.3

FOREIGN PATENT DOCUMENTS

JP          2001-296960 A      10/2001
JP          2005-228043 A       8/2005

\* cited by examiner

*Primary Examiner*—Keith T Ferguson
(74) *Attorney, Agent, or Firm*—Wolf, Greenfield & Sacks, P.C.

(57) ABSTRACT

Provided is an electronic apparatus including a casing, a first jog dial, and a pressing operation detection unit. The casing includes a first surface and a second surface. The first jog dial is exposed from the first surface and the second surface, is capable of rotating around a first axis substantially parallel to the first surface and the second surface as a center, and is capable of being pressed from a first direction substantially perpendicular to the first surface and a second direction substantially perpendicular to the second surface. The pressing operation detection unit detects a first pressing operation from the first direction and a second pressing operation from the second direction.

18 Claims, 24 Drawing Sheets

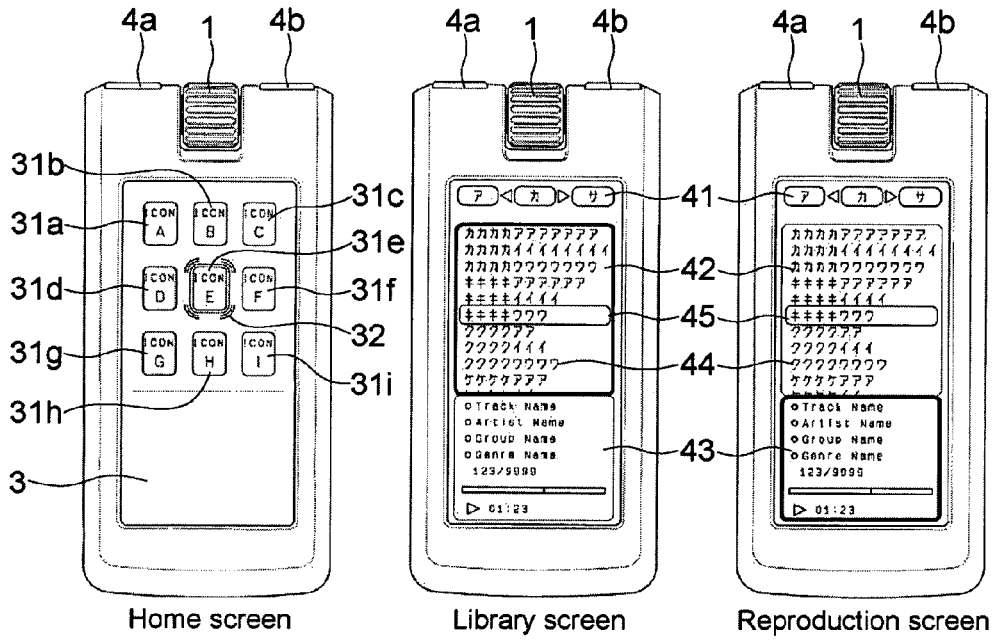
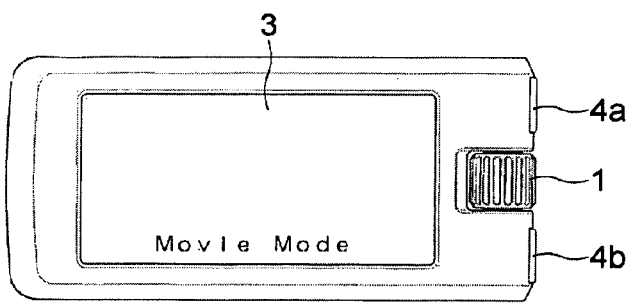
FIG.9D

| A | To track before current track |
|---|---|
| B | Reproduce/stop |
| C | To next track |
| $\theta 1$ | Turn down volume |
| $\theta 2$ | Turn up volume |

FIG.14

| A | To group before current group |
|---|---|
| B | Reproduce/stop |
| C | To next group |
| $\theta 1$ | To track before current track |
| $\theta 2$ | To next track |

FIG.15A

| A | Rewind |
|---|---|
| B | Reproduce/stop |
| C | Fast-forward |
| $\theta 1$ | To track before current track |
| $\theta 2$ | To next track |

FIG.15B

| A | To track before current track |
|---|---|
| B | Reproduce/stop |
| C | To next track |
| $\theta 1$ | To group before current group |
| $\theta 2$ | To next group |

FIG.15C

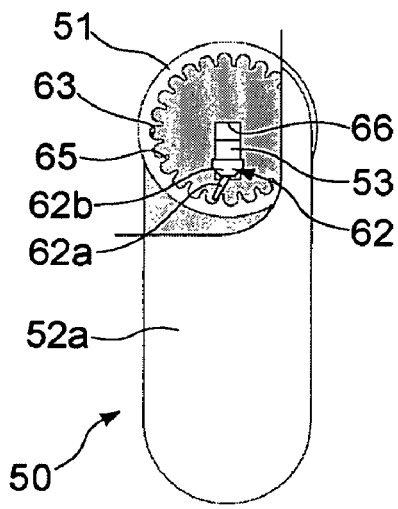 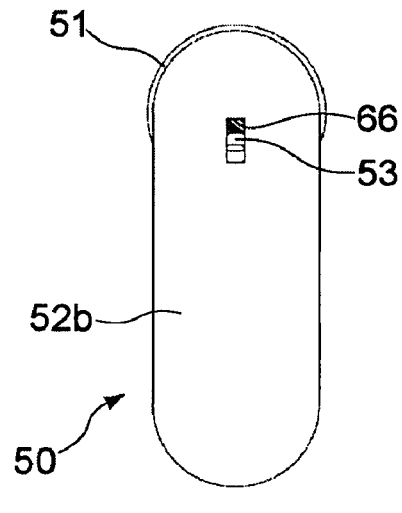
FIG.16A          FIG.16B
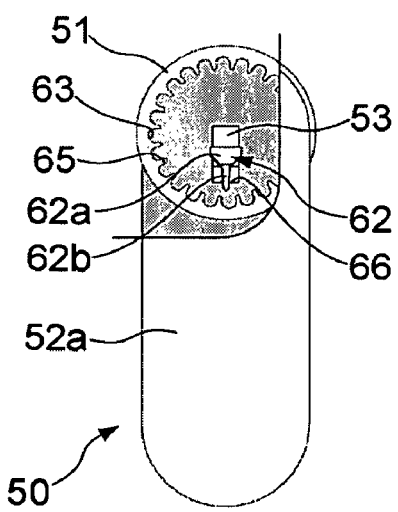 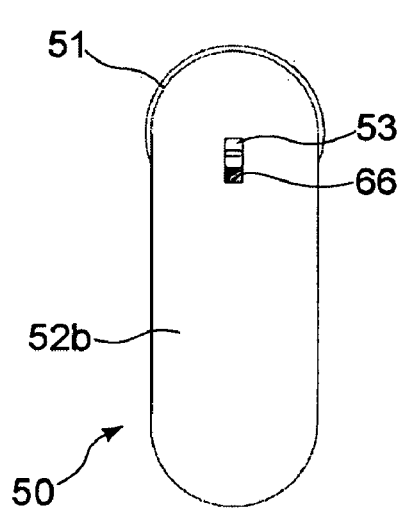
FIG.16C          FIG.16D

| Mode 1 | |
|---|---|
| A | To track before current track |
| B | Reproduce/stop |
| C | To next track |
| θ1 | Turn down volume |
| θ2 | Turn up volume |

FIG.17A

| Mode 2 | |
|---|---|
| A | To next track |
| B | Reproduce/stop |
| C | To track before current track |
| θ1 | Turn up volume |
| θ2 | Turn down volume |

FIG.17B

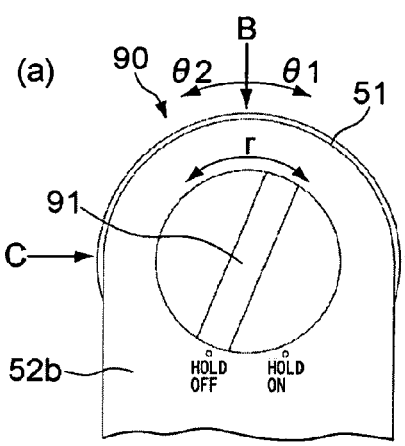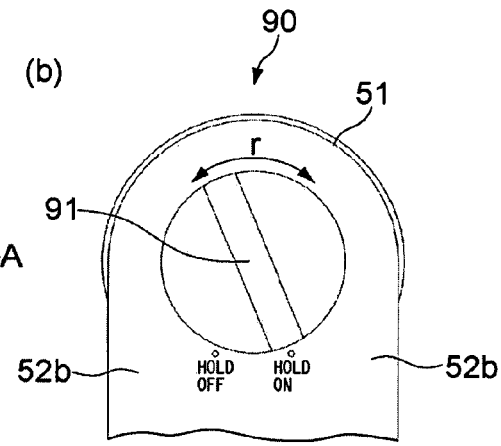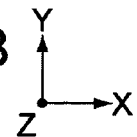
FIG.24A  FIG.24B
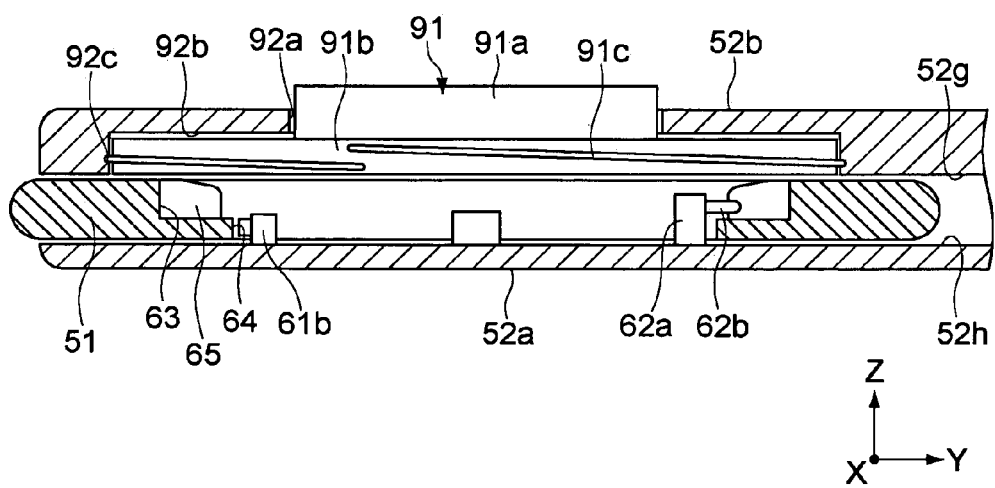
FIG.25

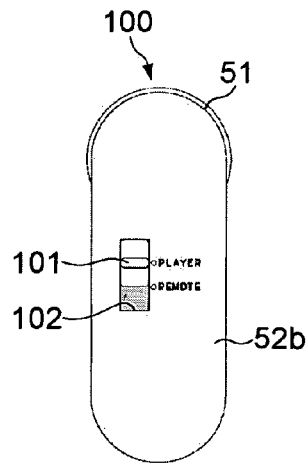
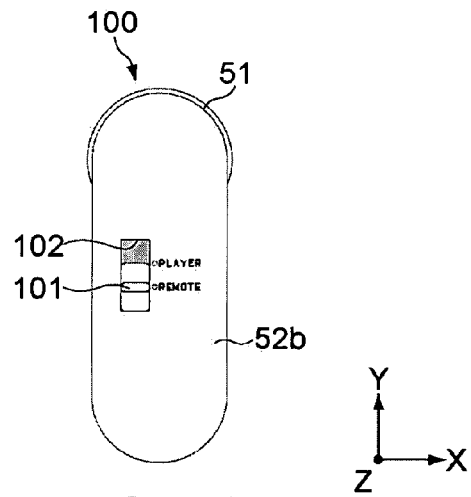

FIG.27A  FIG.27B

| A | To group before current group |
|---|---|
| B | Reproduce/stop |
| C | To next group |
| θ1 | To track before current track |
| θ2 | To next track |

FIG.28A

| A | Rewind |
|---|---|
| B | Reproduce/stop |
| C | Fast-forward |
| θ1 | To track before current track |
| θ2 | To next track |

FIG.28B

| A | To track before current track |
|---|---|
| B | Reproduce/stop |
| C | To next track |
| θ1 | Turn down volume |
| θ2 | Turn up volume |

FIG.28C

| A | To track before current track |
|---|---|
| B | Reproduce/stop |
| C | To next track |
| θ1 | To group before current group |
| θ2 | To next group |

FIG.28D

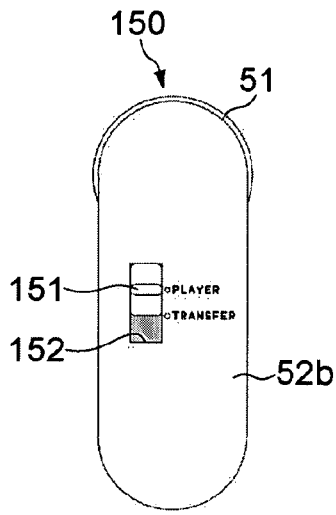 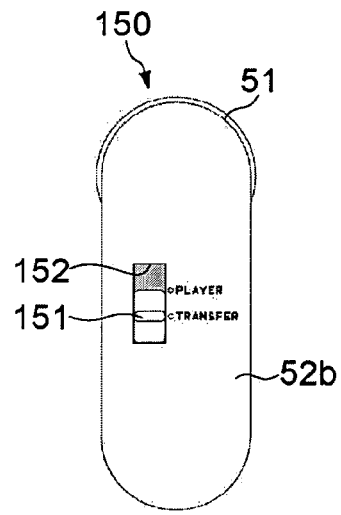
FIG.29A        FIG.29B
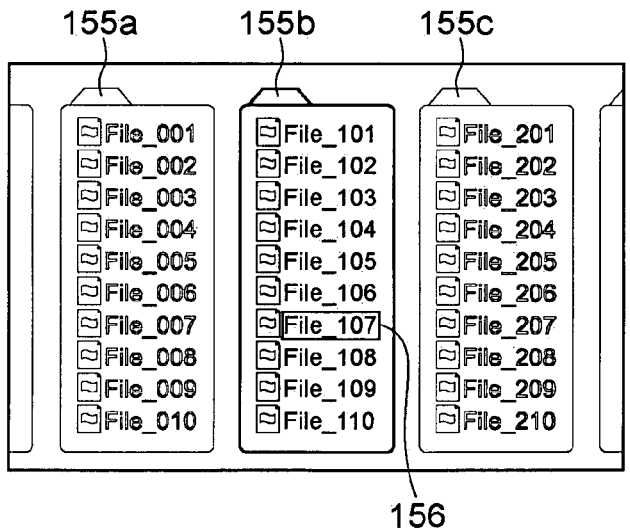
FIG.30A
| A | To folder on left |
| B | Transfer file to designated folder |
| C | To folder on right |
| $\theta 1$ | Move cursor upward |
| $\theta 2$ | Move cursor downward |
FIG.30B

ELECTRONIC APPARATUS

CROSS REFERENCES TO RELATED APPLICATIONS

The present invention contains subject matter related to Japanese Patent Application JP 2007-048482 filed in the Japanese Patent Office on Feb. 28, 2007, the entire contents of which being incorporated herein by reference.

BACKGROUND OF THE INVENTION

1. Field of the Invention

The present invention relates to an electronic apparatus including a jog dial.

2. Description of the Related Art

Up to now, jog dials have been used as operation input devices in electronic apparatuses such as a PC (Personal Computer), cellular phone, PDA (Personal Digital Assistants), and portable AV (Audio Video) apparatus.

The jog dials have a nearly cylindrical shape or a disc shape, and functions are respectively allocated to positive and negative rotating operations with a rotation axis as a center (for example, moving a cursor in a vertical or horizontal direction). Further, one function (for example, determination of a selection item) is allocated to an operation from one direction orthogonal to an exposure surface and the rotation axis of the jog dial.

Therefore, with such jog dials as in the past, it has been difficult to move the cursor in two directions that intersect each other regarding a rotating operation, or enable multidirectional pressing operations to respectively allocate a plurality of functions thereto or enable execution of a single function from various directions regarding pressing operations.

As a technique related to the problem as described above, for example, Japanese Patent Application Laid-open No. 2005-228043 discloses a technique that enables a cursor to move in an X-axis direction (horizontal direction) and a Y-axis direction (vertical direction) on a display with a single jog dial by allowing a frame for holding the jog dial to rotate by 90 degrees with an axis orthogonal to a rotation axis of the jog dial as a center.

SUMMARY OF THE INVENTION

However, the jog dial disclosed in Japanese Patent Application Laid-open No. 2005-228043 still can only be pressed from one direction even though rotating operations in a plurality of directions and allocation of a plurality of functions (moving the cursor in the vertical and horizontal directions) have become possible, thereby resulting in inconvenience. Further, it may be necessary to prepare an operation input unit such as a button in addition to the jog dial for the plurality of functions to be executed through pressing operations in that state, leading to an increase in the number of components and costs. Moreover, an installment space for components other than the operation input unit is accordingly reduced, whereby a degree of freedom in installment of those components decreases.

In view of the circumstances as described above, there is a need for an electronic apparatus including a jog dial with which pressing operations from a plurality of directions are possible.

According to an embodiment of the present invention, there is provided an electronic apparatus including a casing, a first jog dial, and a pressing operation detection unit. The casing includes a first surface and a second surface. The first jog dial is exposed from the first surface and the second surface, is capable of rotating around a first axis substantially parallel to the first surface and the second surface, and is capable of being pressed from a first direction substantially perpendicular to the first surface and a second direction substantially perpendicular to the second surface. The pressing operation detection unit detects a first pressing operation from the first direction and a second pressing operation from the second direction.

With the structure as described above, the first jog dial becomes capable of being pressed from various directions, thereby enhancing convenience. Examples of the electronic apparatus include a PC, PDA, cellular phone, and portable AV apparatus, but are not limited thereto.

The electronic apparatus may further include a control unit causing the electronic apparatus to execute a first function when the first pressing operation is detected and execute a second function different from the first function when the second pressing operation is detected.

With this structure, a plurality of different functions can be executed with a single jog dial, resulting in enhancement of convenience for a user. Further, the number of operation units other than the jog dial can be reduced, or the operation units other than the jog dial can be removed altogether, thereby reducing the number of components and costs.

The electronic apparatus may further include a control unit controlling the electronic apparatus to execute a function when the first pressing operation and the second pressing operation are detected.

With this structure, because the same function is executed with respect to the pressing operations from various directions, the user is capable of readily operating the electronic apparatus in any posture. Further, it is possible to reduce erroneous operations of the user.

The electronic apparatus may be structured such that the casing includes a third surface, the first jog dial is also exposed from the third surface and is capable of being pressed from a third direction substantially perpendicular to the third surface, and the pressing operation detection unit is capable of detecting a third pressing operation from the third direction.

Accordingly, the pressing operation from the third direction can be detected, whereby the convenience of the user with respect to the electronic apparatus is enhanced.

The electronic apparatus may be structured such that the first surface and the second surface are adjacent to each other, and the first jog dial is disposed across an end portion of the first surface to an end portion of the second surface.

Accordingly, spaces of the first surface and the second surface of the electronic apparatus can be used effectively. For example, a larger display unit can be provided on the first surface.

The electronic apparatus may further include a first display unit provided on the first surface and a second display unit provided on the second surface, the first surface and the second surface being opposed to each other.

With this structure, the user can operate two display units with a single jog dial. For example, in a case where the electronic apparatus is applied to a so-called folding type cellular phone and the first display unit is used as a main display unit and the second display unit is used as a sub display unit, by operating the first jog dial from the second surface side while checking the second display unit, the user can perform an operation same as that made from the first surface side without checking the first display unit.

The electronic apparatus may further include a transmission unit and a switch unit. The transmission unit transmits a predetermined signal to another apparatus based on the rotating operation and the pressing operation. The switch unit makes a switch between a first mode in which the first function and the second function can be executed and a second mode in which the predetermined signal can be transmitted by the transmission unit.

With this structure, the user becomes capable of performing an operation for causing the electronic apparatus to execute the first function and the second function and an operation for causing the electronic apparatus to transmit the predetermined signal with a single jog dial. Examples of the another apparatus include electronic apparatuses such as a PC and a stationary AV apparatus, but are not limited thereto.

In the electronic apparatus, the predetermined signal may be a signal for remotely controlling the another apparatus so that the another apparatus executes a predetermined function.

Accordingly, by the user operating the first jog dial at a time of the second mode, it becomes possible to use the electronic apparatus as a remote controller to transmit the signal for remote control to the AV apparatus and the like, thereby causing the AV apparatus and the like to execute a predetermined function.

Examples of the predetermined function include reproduction and stop of tracks, but are not limited thereto.

In the electronic apparatus, the predetermined signal may be a signal related to predetermined content data to be transferred to the another apparatus.

Accordingly, by operating the first jog dial at the time of the second mode, the user becomes capable of transferring the predetermined content data to a PC and the like. Examples of the predetermined content data include a moving image file and music file stored in the electronic apparatus, but are not limited thereto.

The electronic apparatus may be structured such that the first surface and the second surface are opposed to each other, and the electronic apparatus is formed to be symmetric with respect to a first cross-section substantially parallel to the first surface and the second surface and passes substantially the center of the casing, and formed to be symmetric with respect to a second cross-section substantially orthogonal to the first cross-section and passes substantially the center of the casing. Further, the electronic apparatus may be structured such that the pressing operation detection unit is capable of detecting a third pressing operation different from the first pressing operation from the first direction and a fourth pressing operation different from the second pressing operation from the second direction, and the control unit sets a first mode when the third pressing operation is detected and a second mode when the fourth pressing operation is detected, the control unit executing the first function when the first pressing operation is detected and the second function when the second pressing operation is detected in the first mode, and the control unit executing the second function when the first pressing operation is detected and the first function when the second pressing operation is detected in the second mode.

With this structure, because the first surface and the second surface are opposed to each other, there are possible cases where the first surface and the second surface are main surfaces of the casing and where the first surface and the second surface are side surfaces of the casing. In either case, the electronic apparatus is formed such that it is difficult to distinguish which of the main surfaces is a front surface.

The electronic apparatus structured as described above sets the first mode when the third pressing operation by the user is detected, and sets the second mode when the fourth pressing operation is detected. Thus, in the electronic apparatus having the first and second surfaces as the main surfaces, for example, it is possible for the user to arbitrarily define front and back of the electronic apparatus, such as defining the first surface as the front (back) surface when the third pressing operation is performed by the user or defining the second surface as the front (back) surface when the fourth pressing operation is performed by the user.

Further, in the electronic apparatus having the first and second surfaces as the side surfaces of the casing, it is possible for the user to arbitrarily define front and back of the electronic apparatus by, for example, defining the first surface as a side surface on the right-hand side (side surface on the left-hand side, upper side, or lower side) when the third pressing operation is performed by the user or defining the second surface as the side surface on the right-hand side (side surface on the left-hand side, upper side, or lower side) when the fourth pressing operation is performed by the user. Thus, not only the case where it is difficult for the user to visually distinguish the front and back of the electronic apparatus, but also when it is difficult for the user to distinguish the front and back because the electronic apparatus is in a pocket, bag, or the like of the user, or because it is dark around, the user can properly perform operations without mistaking the functions allocated to the first jog dial.

Further, by structuring the electronic apparatus as described above, design on the front and back surfaces can be uniformized, thereby enhancing the degree of freedom in design.

It should be noted that the third and fourth pressing operations are different from the first and second pressing operations. For example, if each of the first and second pressing operations is a single-click operation (operation of pressing and quickly releasing after that), the third and fourth pressing operations are so-called double-click operations (successive double-click operation), although not limited thereto. The third and fourth pressing operations may be, for example, a so-called press-and-hold operation (operation of continuously pressing for a predetermined time) or a triple or more-click operation.

The electronic apparatus may further include a rotating operation detection unit and a regulation unit. The rotating operation detection unit detects the rotating operation. The regulation unit regulates detection by the rotating operation detection unit.

With this structure, the user can arbitrarily regulate the detection of the rotating operation to prevent erroneous detection of the rotating operation due to erroneous operation of the user.

The electronic apparatus may be structured such that the first jog dial is hollow inside and has a plurality of convex portions formed along an inner surface thereof, the rotating operation detection unit includes a rotary switch capable of turning in a pendular state by being brought into contact with the plurality of convex portions along with the rotating operation, and the regulation unit includes an engagement unit and a movable unit. The engagement unit is formed to be capable of engaging with the plurality of convex portions. The movable unit regulates the rotating operation by moving the engagement unit in a rotating radial direction of the first jog dial so that the engagement unit engages with the convex portions.

Thus, since the first jog dial does not rotate at a time of detection regulation, the user can sense a change in mechanical feedback with respect to the rotating operation of the first jog dial between the time of the detection regulation and a time of non-detection regulation. As a result, a regulation state of the electronic apparatus can be easily and intuitively grasped.

The electronic apparatus may be structured such that the first jog dial is hollow inside and has a plurality of convex portions formed along an inner surface thereof, the rotating operation detection unit includes a rotary switch capable of turning in a pendular state by being brought into contact with the plurality of convex portions along with the rotating operation, and the regulation unit includes a movable unit. The movable unit regulates detection of the rotating operation by moving the rotary switch in a rotating radial direction of the first jog dial so that the rotary switch is not brought into contact with the plurality of convex portions.

Thus, the rotary switch is moved away from the convex portions and the first jog dial is idly rotated at the time of the detection regulation. Therefore, by sensing the change in mechanical feedback with respect to the rotating operation of the first jog dial between the time of the detection regulation and the time of the non-detection regulation, the user can easily and intuitively grasp that the operation to the first jog dial is regulated.

In the electronic apparatus, the regulation unit may regulate detection by the pressing operation detection unit while regulating the detection by the rotating operation detection unit.

With this structure, it is possible for the user to arbitrarily regulate not only the detection of the rotating operation but also the detection of the pressing operation, whereby erroneous detection of the pressing operation due to the erroneous operation of the user can be prevented.

The electronic apparatus may be structured such that the first jog dial is hollow inside and has a plurality of convex portions formed along an inner surface thereof, the rotating operation detection unit includes a rotary switch capable of turning in a pendular state by being brought into contact with the plurality of convex portions along with the rotating operation, the pressing operation detection unit includes a first pressing switch detecting the first pressing operation and a second pressing switch detecting the second pressing operation, and the regulation unit includes a first retention member, a second retention member, a movable unit, and a rotary member. The first retention member retains the first pressing switch and is movable in the first direction by a pressing force of the first pressing operation at a time of detection regulation. The second retention member retains the second pressing switch and is movable in the second direction by the pressing force of the second pressing operation at the time of the detection regulation. The movable unit retains the rotary switch and has a protrusion protruding in an axial direction, and is movable in a rotating radial direction of the first jog dial. The rotary member is provided inside the first jog dial, is rotatable around the first axis, and includes a first support unit, a second support unit, and a guide groove. The first support unit makes the detection possible by regulating a movement of the first pressing switch by supporting the first retention member from a third direction opposite to the first direction at a time of non-detection regulation, and releases the support from the third direction by the rotation at the time of the detection regulation. The second support unit makes the detection possible by regulating a movement of the second pressing switch by supporting the second retention member from a fourth direction opposite to the second direction at the time of the non-detection regulation, and releases the support from the fourth direction by the rotation at the time of the detection regulation. The guide groove is engaged with the protrusion and guides the protrusion by the rotation at the time of the detection regulation to enable the movable unit to move so that the rotary switch is not brought into contact with the plurality of convex portions.

Thus, the detection of the rotating operation is regulated since the rotary switch is idly turned by the rotation of the rotary member, and the detection of the pressing operation is regulated by the support of the retention members by the respective support units being released therefrom. As described above, it is possible to regulate the rotating operation and the pressing operation with a single member at the same time, whereby the number of components can be reduced as compared to the case where both operations are regulated by different members, and user convenience is also enhanced.

The electronic apparatus may be structured such that the casing includes a third surface, a fourth surface, a first inner surface, and a second inner surface. The third surface is adjacent to the first surface and the second surface. The fourth surface is opposed to the third surface and is adjacent to the first surface and the second surface. The first inner surface is opposed to the third surface. The second inner surface is opposed to the fourth surface and the first inner surface. In the electronic apparatus, the first jog dial may be provided between the first inner surface and the second inner surface, and the regulation unit may include a fixation unit. The fixation unit is provided between the first inner surface and the first jog dial and is movable in a direction of the first axis, and fixes the first jog dial such that the first jog dial is sandwiched between the fixation unit and the second inner surface in a manner that disables the rotating operation and the pressing operation with respect to the first jog dial, by causing the first jog dial to move in the direction of the first axis to the second inner surface side at a time of detection regulation.

Accordingly, the first jog dial is fixed by being sandwiched between the fixation unit and the second inner surface by the movement of the fixation unit, leading to regulation of the detection of the rotating and pressing operations. In other words, the first jog dial is locked at the time of the detection regulation, and the rotating and pressing operations therefore become difficult. Thus, by sensing the change in mechanical feedback with respect to the rotating operation and the pressing operation of the first jog dial between the time of the detection regulation and the time of the non-detection regulation, the user can easily and intuitively grasp that the operation to the first jog dial is regulated.

The electronic apparatus may be structured such that the casing includes a third surface opposed to the second surface and adjacent to the first surface, and the electronic apparatus further includes a second jog dial. The second jog dial is exposed from the first surface and the third surface and is provided across the end portion of the first surface to an end portion of the third surface, is capable of rotating around a second axis substantially parallel to the first surface and the third surface, and is capable of being pressed from a third direction substantially perpendicular to the third surface and the first direction. In addition, in the electronic apparatus, the pressing operation detection unit may detect a third pressing operation from the first direction and a fourth pressing operation from the third direction with respect to the second jog dial.

With this structure, because the electronic apparatus includes the second jog dial exposed from the first surface and the third surface in addition to the first jog dial, in the case of allocating different functions to the respective pressing operations of the jog dials, it becomes possible to allocate more functions to the jog dials. Further, in the case of allocating the same function to the pressing operations of the jog dials, it becomes possible to execute the same function through the pressing operations in a wider range of directions. In other words, in either case, the user convenience can be enhanced.

The electronic apparatus may be structured such that the electronic apparatus is formed to be symmetric with respect to a first cross-section substantially parallel to the second surface and the third surface and passes substantially the center of the casing, and formed to be symmetric with respect to a second cross-section substantially orthogonal to the first cross-section, passes substantially the center of the casing, and is substantially perpendicular to the first axis and the second axis, and the pressing operation detection unit is capable of detecting a fifth pressing operation, a sixth pressing operation, a seventh pressing operation, and an eighth pressing operation, the electronic apparatus further including a control unit. The fifth pressing operation is from the first direction with respect to the first jog dial and is different from the first pressing operation. The sixth pressing operation is from the second direction with respect to the first jog dial and is different from the second pressing operation. The seventh pressing operation is from the first direction with respect to the second jog dial and is different from the third pressing operation. The eighth pressing operation is from the third direction with respect to the second jog dial and is different from the fourth pressing operation. The control unit sets a first mode when one of the fifth pressing operation and the sixth pressing operation is detected and sets a second mode when one of the seventh pressing operation and the eighth pressing operation is detected. In the first mode, a first function is executed when the first pressing operation is detected, a second function is executed when the second pressing operation is detected, a third function is executed when the third pressing operation is detected, and a fourth function is executed when the fourth pressing operation is detected. In the second mode, the third function is executed when the first pressing operation is detected, the fourth function is executed when the second pressing operation is detected, the first function is executed when the third pressing operation is detected, and the second function is executed when the fourth pressing operation is detected.

With this structure, for example, when the first surface and a surface opposed to the first surface are used as main surfaces (front and back surfaces), the electronic apparatus is formed such that it is difficult to distinguish upper and lower sides and left- and right-hand sides when seen from either of the main surfaces.

The electronic apparatus formed as described above sets the first mode when the fifth and sixth pressing operations by the user are detected, and sets the second mode when the seventh and eighth pressing operations are detected. Accordingly, for example, in the electronic apparatus having the first surface and the surface opposed to the first surface as the main surfaces, it is possible for the user to arbitrarily define the upper and lower sides and left- and right-hand sides of the main surfaces of the electronic apparatus, such as defining the second surface as a side surface on the right-hand side (side surface on the left-hand, upper, or lower side) when the fifth or sixth pressing operation is performed by the user, or the third surface is defined as the side surface on the right-hand side (side surface on the left-hand, upper, or lower side) when the seventh or eighth pressing operation is performed by the user. Thus, not only the case where it is difficult for the user to visually distinguish the upper and lower sides and left- and right-hand sides of the electronic apparatus, but also when it is difficult for the user to distinguish the upper and lower sides and left- and right-hand sides because the electronic apparatus is in a pocket, bag, or the like of the user, or because it is dark around, the user can properly perform operations without mistaking the functions allocated to the first and second jog dials. It should be noted that examples of the fifth to eighth pressing operations include a double-click operation and a press-and-hold operation, but are not limited thereto.

In the electronic apparatus, the first jog dial may be provided independent of the casing to be incommunicable with an inner portion of the casing.

Accordingly, dirt and dust are not taken in inside the casing even when the first jog dial is rotated, whereby reliability of the electronic apparatus can be improved.

As described above, according to the embodiment of the present invention, it is possible to provide the electronic apparatus including the jog dial capable of being pressed from a plurality of directions.

These and other objects, features and advantages of the present invention will become more apparent in light of the following detailed description of best mode embodiments thereof, as illustrated in the accompanying drawings.

BRIEF DESCRIPTION OF DRAWINGS

FIG. 9 are diagrams illustrating other examples regarding the allocation of functions to be executed by the multimedia player in accordance with operations to the jog dial according to the first embodiment of the present invention;

FIG. 14 is a diagram showing an example of allocation of functions to operations to the jog dial according to the second embodiment of the present invention;

FIG. 15 is a diagram showing other examples of the allocation of functions with respect to operations to the jog dial according to the second embodiment of the present invention;

FIG. 16 are diagrams showing states in the vicinity of a hold switch before and after a hold operation according to the second embodiment of the present invention;

FIG. 17 are diagrams illustrating two modes when functions are respectively allocated to the operations to the jog dial according to the second embodiment of the present invention;

FIG. 24 are back views of a music player in the vicinity of a jog dial according to a fifth embodiment of the present invention;

FIG. 25 is a sectional view showing principle parts of the music player shown in FIG. 24 seen from a side surface direction;

FIG. 27 are back views of a music player according to a sixth embodiment of the present invention;

FIG. 28 is a diagram illustrating examples of functions respectively allocated to pressing operations and rotating operations to a jog dial in a mode that uses the music player as a remote controller according to the sixth embodiment of the present invention;

FIG. 29 are back views of a music player according to a seventh embodiment of the present invention;

FIG. 30 are diagrams showing an example of functions respectively allocated to pressing operations and rotating operations to a jog dial in a mode that uses the music player as a file transfer apparatus according to the seventh embodiment of the present invention;

DESCRIPTION OF PREFERRED EMBODIMENTS

Hereinafter, embodiments of the present invention will be described with reference to the drawings.

First Embodiment

Figure 1:
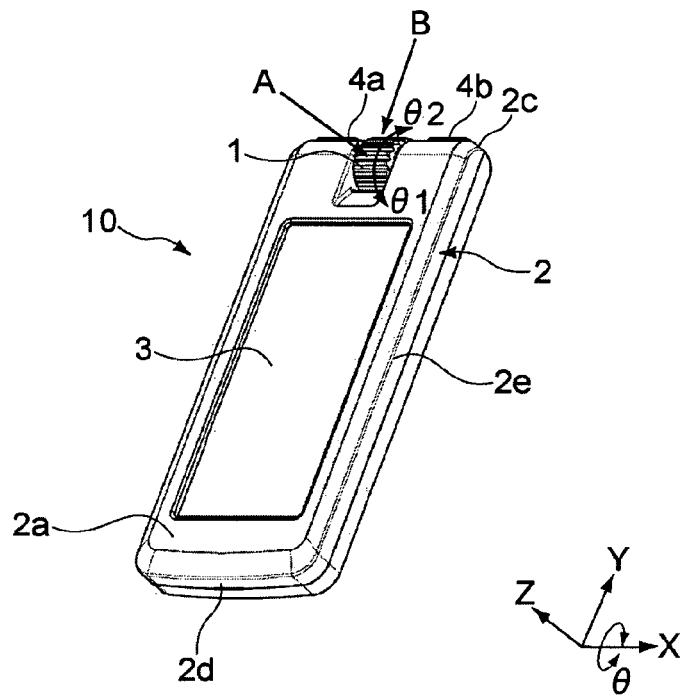
FIG. 1 is a perspective view of a multimedia player seen from a front surface direction according to a first embodiment of the present invention.
Figure 2:
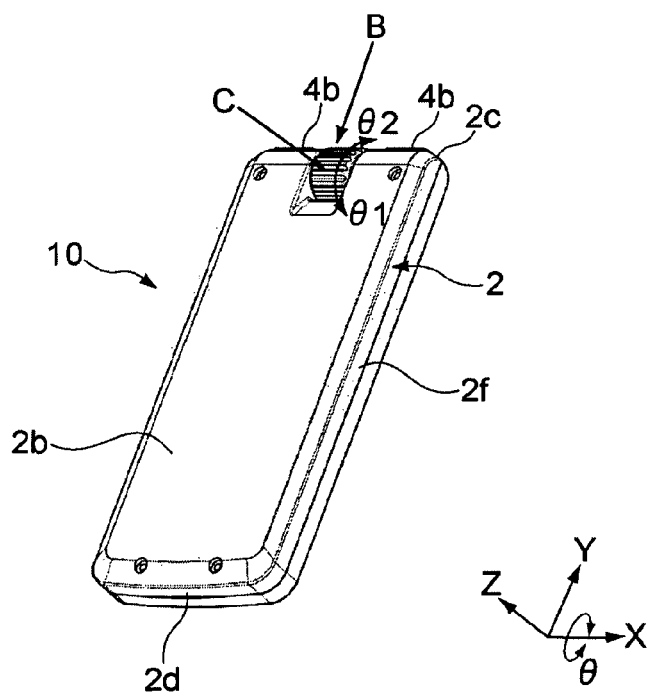
FIG. 2 is a perspective view of the multimedia player shown in FIG. 1 seen from a back surface direction.
Figure 3:
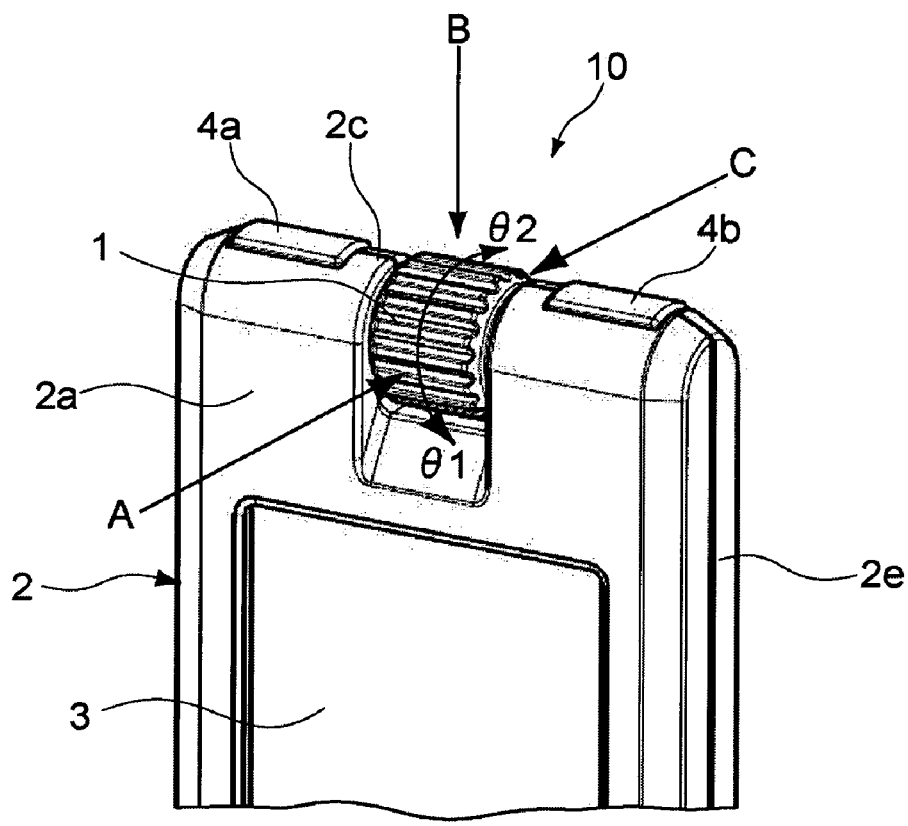
FIG. 3 is an enlarged view of the multimedia player shown in FIG. 1 in the vicinity of a jog dial.

First, a description will be given of a first embodiment of the present invention. In this embodiment, as an electronic apparatus, a multimedia player capable of reproducing various contents including a music content and a moving image content is applied. FIG. 1 is a perspective view of a multimedia player 10 seen from a front surface direction according to this embodiment. FIG. 2 is a perspective view of the multimedia player 10 shown in FIG. 1 seen from a back surface direction. Further, FIG. 3 is an enlarged view of the multimedia player 10 in the vicinity of a jog dial 1.

As shown in those figures, a casing 2 of the multimedia player 10 includes a front surface 2a, a back surface 2b, an upper surface 2c, a lower surface 2d, a right-hand side surface 2e, and a left-hand side surface 2f. The front surface 2a of the casing 2 is provided with, for example, a display unit 3 including a liquid crystal panel composed of a TFT (Thin Film Transistor) and the like. The casing 2 has in the middle of the upper portion thereof the jog dial 1 that is exposed from an end portion of the front surface 2a across the upper surface 2c over to an end portion of the back surface 2b. The jog dial 1 has a substantially cylindrical shape, is provided capable of rotating in θ1 and θ2 directions in the figures around an axis in an X direction in the figures substantially parallel to the front surface 2a, the lower surface 2d, and the upper surface 2c, and is provided capable of being pressed in A, B, and C directions in the figures. Rotating operations and pressing operations are allocated with predetermined functions of the multimedia player 10. Details of allocation of the functions will be described later.

As described above, the jog dial 1 is provided from the end portion of the front surface 2a across the upper surface 2c over to the end portion of the back surface 2b. Thus, a space of the front surface 2a can be used effectively to enable provision of a larger display unit such as the display unit 3.

Further, the upper surface 2c is provided with an L button 4a and an R button 4b, which are capable of being pressed, sandwiching the jog dial 1. The LR buttons 4 are allocated with functions not executable by the jog dial 1 alone, for example.

Figure 4:
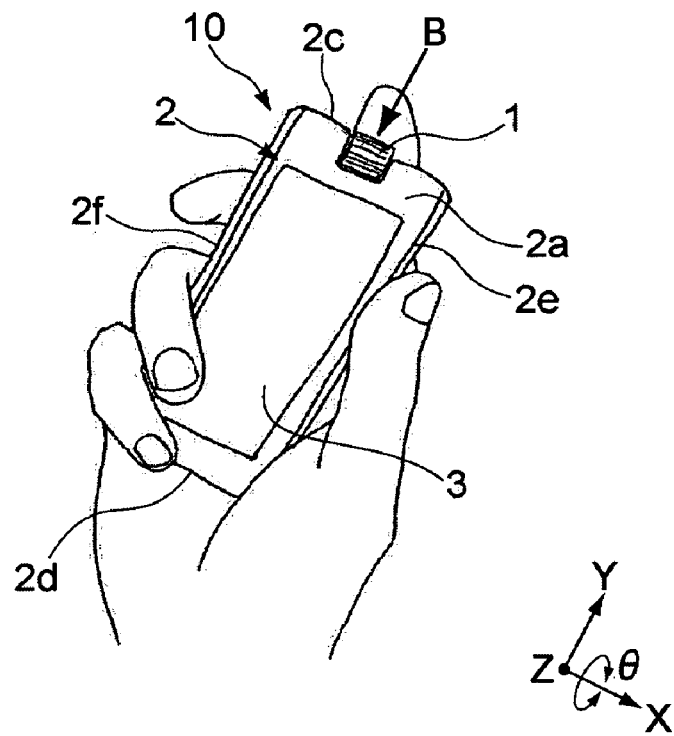
FIG. 4 is a view showing a state where a user is using the multimedia player with its longitudinal direction as a vertical direction according to the first embodiment of the present invention.

FIG. 4 is a view showing a state where a user is using the multimedia player 10 with its longitudinal direction (Y direction in the figure) as a vertical direction. In this use state, a selection operation and reproduction operation of a music content, and the like are performed, for example. Because the jog dial 1 is exposed not only from the front surface 2a but also from the upper surface 2c and the back surface 2b as described above, the user can operate the jog dial 1 from the back surface 2b. Thus, the user becomes capable of performing the operation while firmly holding the multimedia player 10 from the back surface 2b side, and to perform the operation without covering the display unit 3 with his/her own finger. In addition, in the figure, a state where the multimedia player is used with a right hand is shown, but the same operation is possible with a left hand. In other words, the provision of the jog dial 1 at the above-mentioned position on the casing 2 enables operations that do not depend on a dominant hand of the user.

Figure 5:
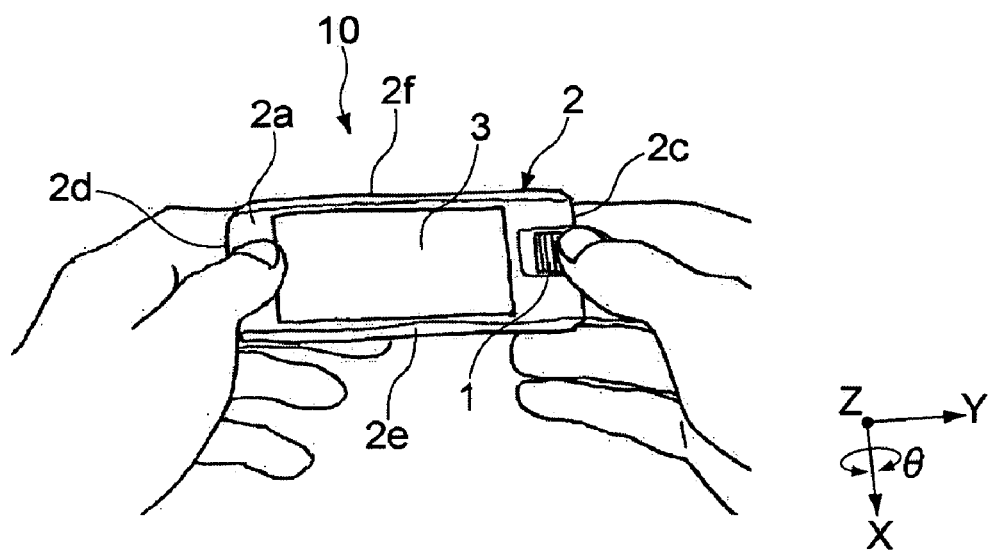
FIG. 5 is a view showing a state where the user is using the multimedia player with its longitudinal direction as a horizontal direction according to the first embodiment of the present invention.

FIG. 5 is a view showing a state where the user is using the multimedia player 10 with the longitudinal direction (Y direction in the figure) as a horizontal direction. In this use state, a reproduction operation of a moving image content is performed, for example. In this case, the user is capable of operating the jog dial 1 with a right thumb while holding the casing 2 with both hands.

Figure 6:
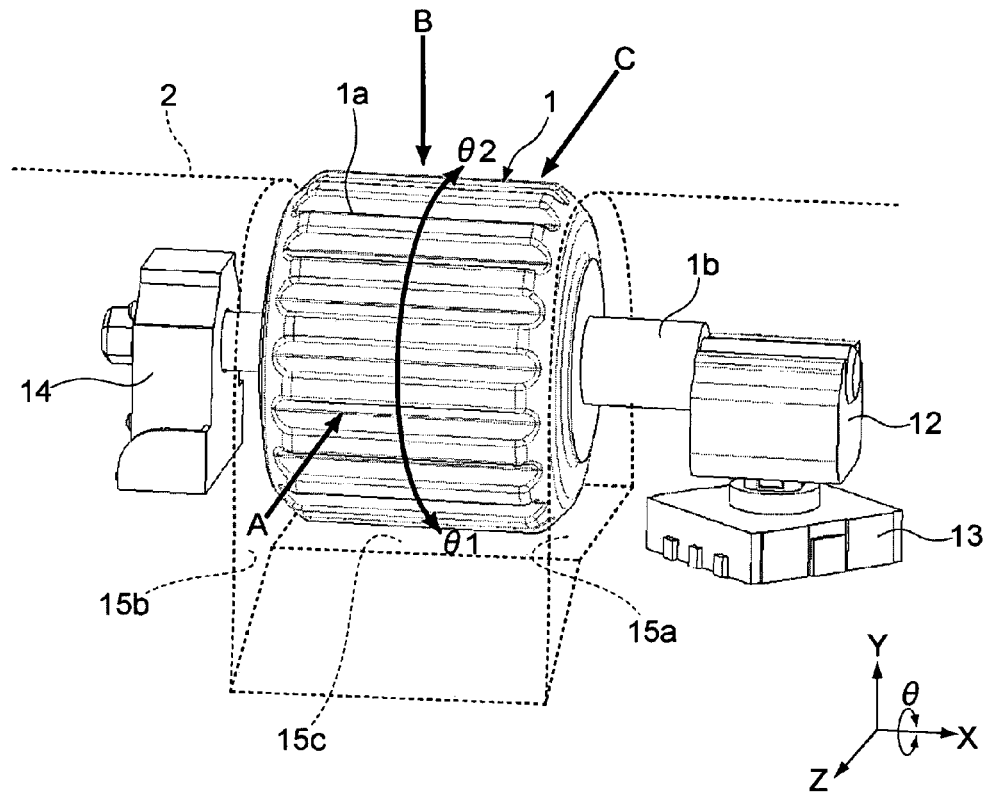
FIG. 6 is a diagram showing an internal structure of the multimedia player in the vicinity of the jog dial according to the first embodiment of the present invention.

FIG. 6 is a view showing an internal structure of the multimedia player 10 in the vicinity of the jog dial 1. As shown in the figure, the jog dial 1 is composed of a main body 1*a* of a substantially cylindrical shape and an axis 1*b* extending in the X direction of the figure, which are integrally formed. In addition, a bearing 12 for rotatably supporting one end of the axis 1*b*, a pressing detection switch 13 for supporting the bearing 12, and an encoder 14 for rotatably supporting the axis 1*b* are provided inside the casing 2.

The bearing 12 is capable of moving in the A, B, and C directions indicated in the figure according to the pressing operations by the user from the A, B, and C directions, respectively. The pressing detection switch 13 is, for example, a 5-way switch (so-called joystick). The 5-way switch originally is capable of detecting operations in a total of five directions, that is, a vertical direction (B direction in the figure) and four directions on a horizontal plane (A and C directions in the figure and two directions parallel to the axis 1*b*). However, in this embodiment, operations to the jog dial 1 in the total of three directions of A, B, and C directions are detected. In other words, when pressing operations in the A, B, and C directions in the figure are performed with respect to the jog dial 1, a pressing force thereof is transferred to the pressing detection switch 13 via the bearing 12, thereby enabling detection of the pressing operations in the respective directions. Pressing operation detection means of course is not limited to a general-purpose pressing detection switch, and a 3-way switch that supports only the pressing operations in the A, B, and C directions may also be used.

Further, when rotating operations with respect to the main body 1*a* of the jog dial 1 in the θ1 and θ2 directions are performed by the user, the encoder 14 is capable of detecting the rotating operations via the axis 1*b*.

It should be noted that a concave portion formed along the shape of the jog dial 1 is provided from an upper end portion of the front surface 2*a* across the upper surface 2*c* over to an upper end portion of the back surface 2*b* of the casing 2 so that an inner surface 15*a* opposed to the right-hand side surface 2*e*, an inner surface 15*b* opposed to the left-hand side surface 2*f*, and an inner surface 15*c* opposed to the lower surface 2*d* are formed. In addition, the jog dial 1 is provided so as to be fitted to the concave portion and to be surrounded by the inner surfaces 15*a*, 15*b*, and 15*c*. Specifically, the jog dial 1 is independent of the casing 2 and is structured such that dirt and dust are not taken in inside the casing 2 by the rotating operation and the like as compared to the jog dial of the related art, which is in communication with the space inside the casing.

Figure 7:
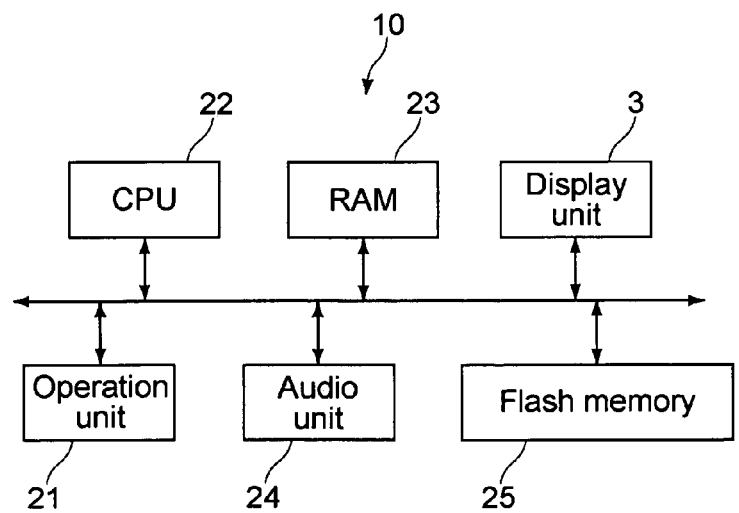
FIG. 7 is a block diagram showing an internal structure of the multimedia player according to the first embodiment of the present invention.

FIG. 7 is a block diagram showing the internal structure of the multimedia player 10. As shown in the figure, the multimedia player 10 includes a CPU 22, a RAM (Random Access Memory) 23, an audio unit 24, and a flash memory 25 in addition to the operation unit 21 having the jog dial 1 and the LR buttons 4, and the display unit 3.

The CPU 22 collectively controls the multimedia player 10 by exchanging signals with structural elements of the multimedia player 10.

The RAM 23 stores data as a work region in various types of data processing of the CPU 22 if necessary. The flash memory 25 stores various programs and data such as a control program for the CPU 22 to control each unit, various types of initial settings data, a moving image content, and a music content. In addition, the flash memory 25 also stores data and program for causing various functions to be executed in accordance with the rotating and pressing operations to the jog dial 1 in the respective directions.

The operation unit 21 is composed of the jog dial 1, the LR buttons 4, the pressing detection switch 13, the encoder 14, and the like, and when input with an operation of the user detected by the pressing detection switch 13, the encoder 14, and the like, the operation unit 21 transmits the input signal to the CPU 22 to cause processing corresponding to the input operation to be executed.

The audio unit 24 is composed of, for example, an amplifier and a speaker (both of which are not shown), and amplifies an audio signal extracted from various contents or the like read out from the flash memory 25 and the like by the amplifier to auditorily output the amplified signal from the speaker. Further, the display unit 3 visually outputs a video signal extracted from a moving image content or the like read out from the flash memory 25 and the like.

It should be noted that although not shown, the multimedia player 10 includes a USB interface for exchanging various contents and the like with an external recording media and the like via a USB (Universal Serial Bus).

FIG. 8 are diagrams illustrating allocation of functions to be executed by the multimedia player 10 in accordance with the rotating and pressing operations to the jog dial 1 and the pressing operation to the LR buttons 4. As shown in the figures, in this embodiment, different functions are respectively allocated to the pressing operations to the jog dial 1 from the A, B, and C directions, the rotating operations in the θ1 and θ2 directions, and the pressing operations to the LR buttons 4. Thus, the user can execute a plurality of different functions by operating a single jog dial 1. In addition, due to concentration of the operation system, a reduction in the number of members of the operation unit other than the jog dial 1 as well as a ready operation becomes possible, whereby the number of components and costs can be reduced.

In this embodiment, the multimedia player 10 is capable of displaying on the display unit 3 a home screen, a library screen, a music reproduction screen, and a moving image reproduction screen, for example. The user performs various selection operations on the various screens using the jog dial 1 and the LR buttons 4. Hereinafter, a description will be given of those various screens and operation methods therefor. FIG. 8 are diagrams showing examples of those various screens.

Figures 8A, 8B, 8C:
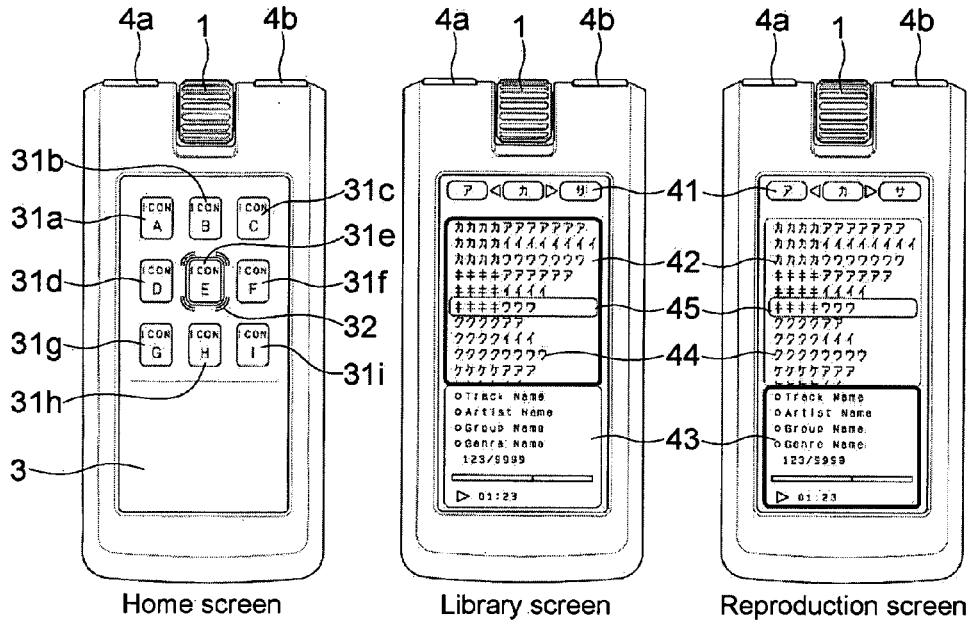
FIG. 8 are diagrams illustrating examples of allocation of functions to be executed by the multimedia player in accordance with operations to the jog dial according to the first embodiment of the present invention.

FIG. 8A shows a display example of the home screen and a diagram showing allocation of functions to user operations performed on the home screen. As shown in the figure, a plurality of icons (31*a* to 31*i*) arranged at regular intervals in the X and Y directions and a cursor 32 used for selecting one of those icons are displayed on the home screen. Each of the icons 31 corresponds to one of various menus including a music content menu and a moving image content menu.

The cursor 32 is capable of moving in the Y direction according to the rotating operation of the user in the θ1 and θ2 directions, and is also capable of moving in the X direction according to the pressing operations to the L button 4*a* and the R button 4*b*. In addition, by pressing the jog dial 1 from the A or B direction in a state where the cursor 32 is placed on a predetermined icon 31, the user can select each of the various menus. Thus, it is possible for the user to operate the jog dial 1, the L button 4*a*, and the R button 4*b* as an arrow key.

It should be noted that the cursor 32 may be set to be capable of moving in the X and Y directions by the rotating operation alone of the user in the θ1 and θ2 directions, and functions other than the moving of the cursor 32 may be allocated to the pressing operations to the L button 4a and the R button 4b. In this case, the cursor 32 moves in the stated order of the icon 31a, 31d, 31g, 31b, 31e, 31h, 31c, 31f, 31i, and 31a according to the rotating operation by the user in the θ1 direction. The cursor 32 moves in the reverse order when the rotating operation in the θ2 direction is performed.

FIG. 8B shows an example of the library screen that is displayed when the music content menu is selected on the home screen, and a diagram showing the allocation of functions to the user operations performed on the library screen. The library screen is composed of a library window 42 for displaying track titles 44 each being listed in the X direction in each row in the order of the Japanese syllabary, and a row icon 41 for selecting each of the rows.

A cursor 45 for selecting one track title is displayed on the library window 42. It should be noted that a reproduction window 43 for displaying a track title and artist name of the track that is being reproduced, a name of a group to which the track belongs, a reproduction time of the track, and the like is displayed at the bottom of the library window 42. However, on the library screen, an operation to the reproduction window 43 may be impossible.

On the library screen, the cursor 45 is capable of moving in the vertical direction (Y direction) according to the rotating operations by the user in the θ1 and θ2 directions. Accordingly, even when selection items are densely arranged in the Y direction as in the library window 42, by rotating the jog dial 1, the user can readily select a target track. Further, by pressing the jog dial 1 from the A or B direction in a state where the cursor 45 is placed on a predetermined track title 44, the user can select and reproduce a track corresponding to that track title 44.

Further, the row icon 41 is composed of, for example, three icons, and a row icon 41 indicating a row to which the currently selected track title belongs is displayed in the middle of the library window 42 and row icons 41 indicating rows before and after the selected row are respectively displayed on both sides thereof. The user can skip to the previous row by pressing the L button 4a and skip to the next row by pressing the R button 4b. In addition, the track titles 44 displayed on the library window 42 are also changed in accordance with skip processing by the row icons 41. Thus, the user can readily find the target track.

Moreover, a function of returning to the previous screen, that is, the home screen is allocated to the pressing operation from the back surface direction in the C direction. Thus, the user is capable of returning to the home screen without removing his/her finger from the jog dial 1. Further, because the operation from the C direction is an operation from the back surface 2b side of the casing 2, the user can intuitively recognize the function of "returning to the previous screen".

FIG. 8C shows an example of the music reproduction screen displayed when a certain track is selected on the library screen, and a diagram showing the allocation of functions to the user operations performed on the music reproduction screen. In the figure, the operation by the row icons 41 and the operation by the cursor 45 on the library window 42 are inhibited and only the operation with respect to the reproduction window 43 is allowed.

On the music reproduction screen, by pressing the jog dial 1 from the A or B direction, the user can perform reproduction/stop of the track. Further, by pressing the jog dial 1 from the C direction, the user can return to the previous screen, that is, the library screen. Furthermore, processing of switching the display to the reproduction of the tracks before and after the selected track on the library window 42 is allocated to the rotating operations of the jog dial 1 in the θ1 and θ2 directions, respectively. In addition, processing of switching the display so that tracks belonging to groups before and after the group to which the track currently being reproduced belongs are displayed on the library window 42 is allocated to the L button 4a and the R button 4b, respectively.

Figure 8D:
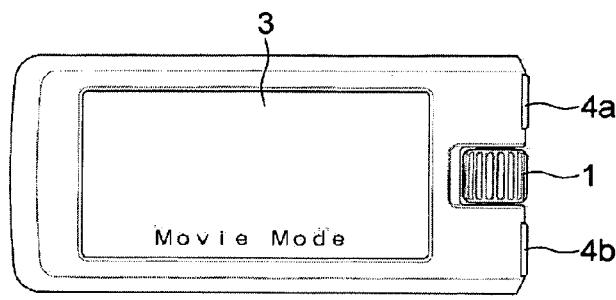

FIG. 8D shows an example of the moving image reproduction screen displayed when the moving image content menu is selected on the home screen, and a diagram showing the allocation of functions to the user operations performed on the moving image reproduction screen. It should be noted that in the display of the moving image reproduction screen, an operation of selecting reproduction of a certain moving image content from the library screen similar to that of the music contents is performed. In the case where the selection operation is performed, the multimedia player 10 switches a display direction of the display unit 3 so that the Y direction becomes the horizontal direction as shown in FIG. 5.

On the moving image reproduction screen, the user can perform reproduction/stop of the moving image content by pressing the jog dial 1 from the A or B direction as in the case of the music reproduction screen. The moving image content is displayed on an entire screen of the display unit 3. Further, by pressing the jog dial 1 from the C direction, the user is capable of canceling the full-screen display to switch the display back to the previous screen such as the library screen. Furthermore, processing of switching the display to the reproduction of the moving image contents before and after the selected content on the library screen is allocated to the rotating operations to the jog dial 1 in the θ1 and θ2 directions, respectively. In addition, rewinding processing and fast-forwarding processing of the moving image content that is currently being reproduced are allocated to the L button 4a and the R button 4b, respectively.

As described above, by enabling the pressing operations to the jog dial 1 from various directions, a variety of functions are allowed to be allocated to various types of processing of the multimedia player 10, thereby enhancing operability and convenience.

It should be noted that in FIG. 8, different functions have been allocated to the pressing operations to the jog dial 1 in the A, B, and C directions. However, the same function may be allocated to those pressing operations. FIG. 9 are diagrams illustrating the allocation of functions in this case. In the figures, structural parts similar to that of FIG. 8 are denoted by the same reference numerals and descriptions thereof will be omitted.

As shown in the figures, the same function such as selection of an icon 31, selection and reproduction of a track title 44, and reproduction/stop of the track, is allocated to the pressing operations to the jog dial 1 in the A, B, and C directions. Accordingly, the user can readily operate the multimedia player 10 in any posture and reduce erroneous operations.

Second Embodiment

Next, a second embodiment of the present invention will be described. In this embodiment, parts having the same structures and functions as in the first embodiment are denoted by the same reference numerals and descriptions thereof will be omitted or simplified. In this embodiment, the present invention is applied to a portable music player as the electronic apparatus capable of reproducing music contents.

Figure 10:
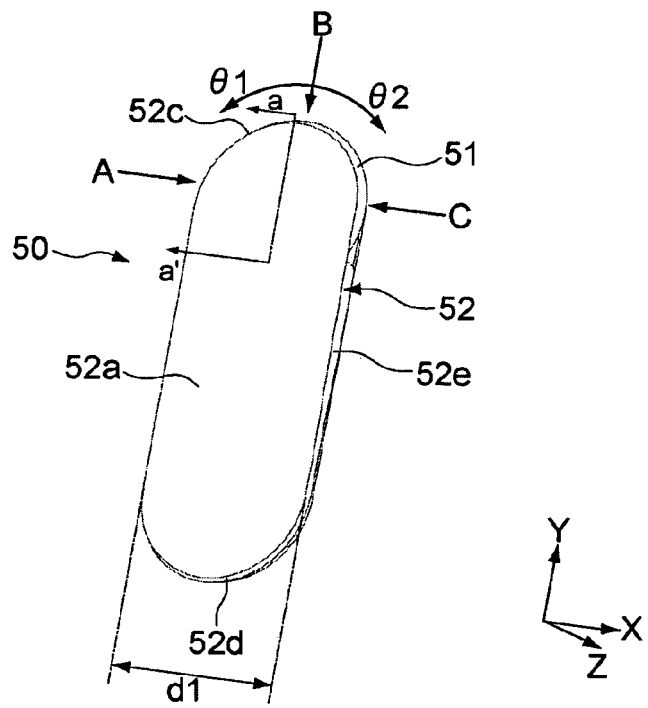
FIG. 10 is a perspective view of a music player seen from a front surface direction according to a second embodiment of the present invention.
Figure 11:
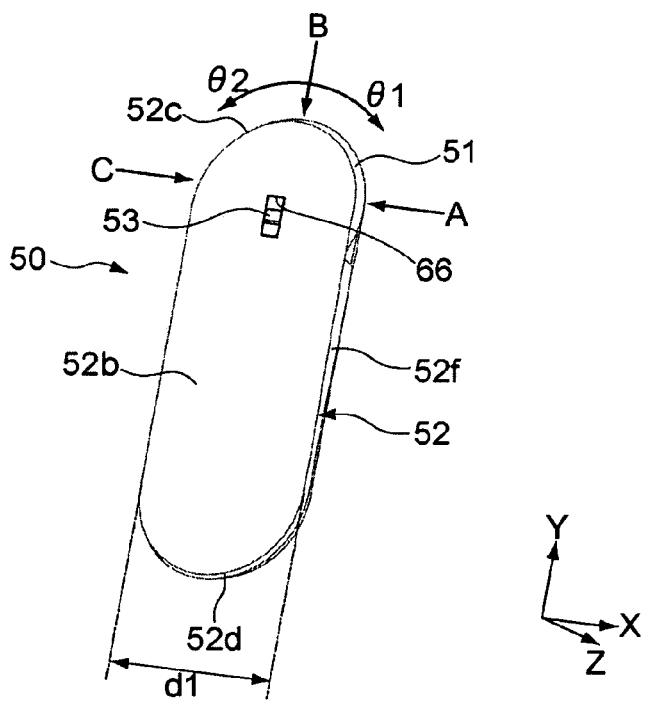
FIG. 11 is a perspective view of the music player shown in FIG. 10 seen from a back surface direction.

FIG. 10 is a perspective view of a music player 50 seen from a front surface direction according to this embodiment. Further, FIG. 11 is a perspective view of the music player 50 seen from the back surface direction. The music player 50 is of a size that can be grasped by hand.

As shown in those figures, a casing 52 of the music player 50 includes a front surface 52a, a back surface 52b, an upper surface 52c, a lower surface 52d, a right-hand side surface 52e, and a left-hand side surface 52f. A jog dial 51 is provided in the middle of the upper portion of the casing 52 so as to be exposed from an end portion of the right-hand side surface 52e across the upper surface 52c to an end portion of the left-hand side surface 52f. The jog dial 51 is provided capable of rotating in the θ1 and θ2 directions around an axis in a Z direction in the figure, which is substantially perpendicular to the front surface 52a and the back surface 52b, and is capable of being pressed in the A, B, and C directions in the figure. Thus, the user is capable of performing operations with only the thumb, and also capable of operating the music player 50 by the feel of the hand without looking. Further, provision of the jog dial 51 at the above-mentioned position enables operations that do not depend on the dominant hand of the user.

The jog dial 51 has a substantial disk shape which is formed to have a diameter slightly larger than a distance d1 between the right-hand side surface 52e and the left-hand side surface 52f. Specifically, the jog dial 51 is remarkably enlarged in relative size with respect to the casing as compared to a so-called side jog of the related art. Thus, the user is allowed to easily and readily operate even the small-size music player 50.

The back surface 52b of the casing is provided with, at a position corresponding to the jog dial 51, a hold switch 53 for regulating (holding) detection of the rotating operation to the jog dial 51 in the θ1 and θ2 directions.

Figure 12:
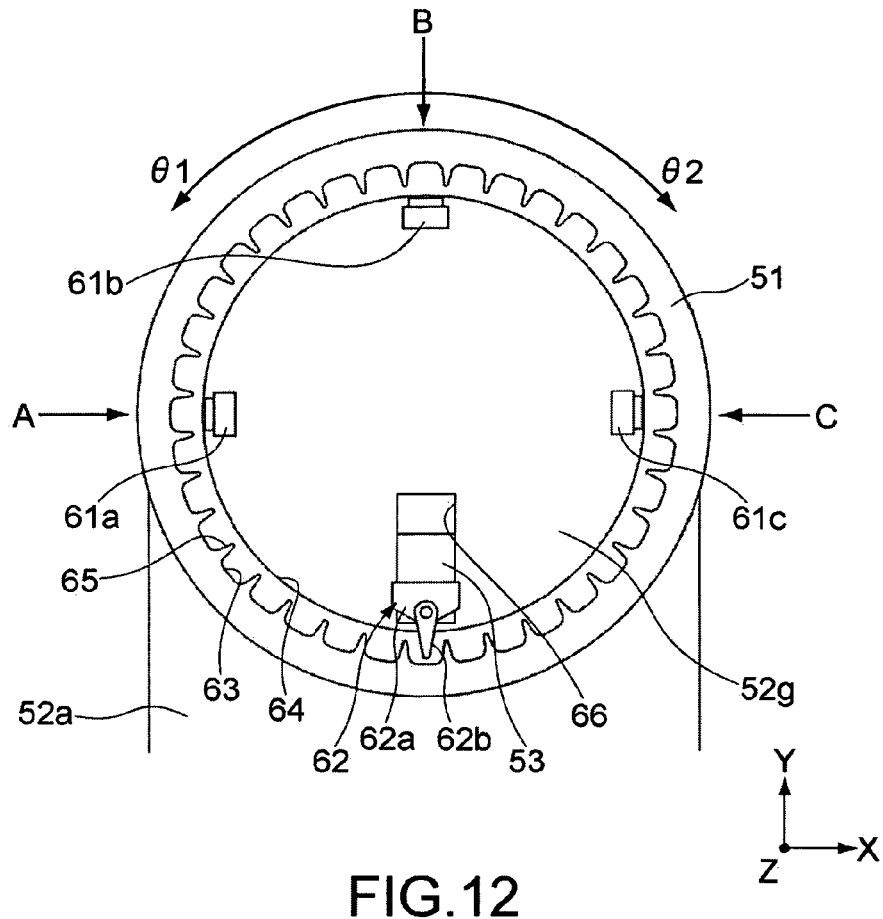
FIG. 12 is a front view showing an internal structure of the music player in the vicinity of a jog dial according to the second embodiment of the present invention.
Figure 13:
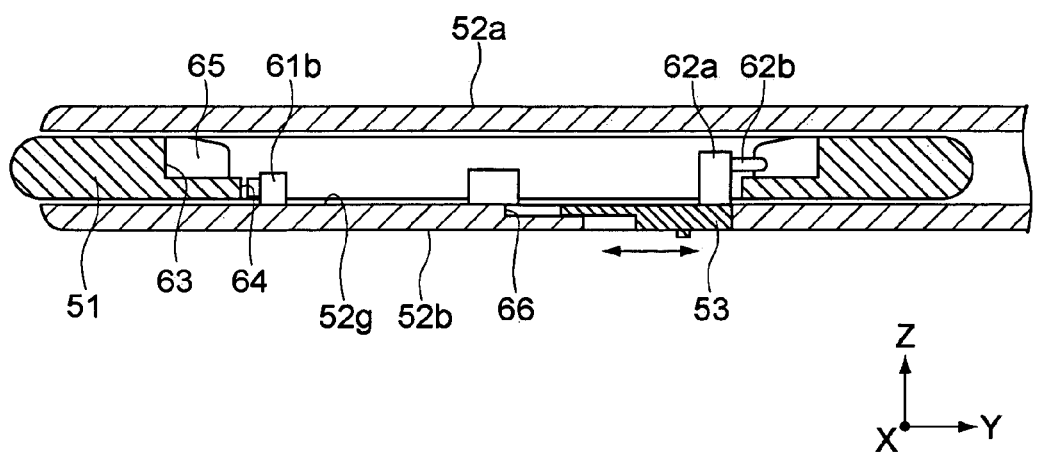
FIG. 13 is a sectional view of the music player shown in FIG. 10 taken along the line a-a'.

FIG. 12 is a front view showing an internal structure of the music player 50 in the vicinity of the jog dial 51. In addition, FIG. 13 is a sectional view taken along the line a-a' of FIG. 10.

As shown in the figures, the jog dial 51 is hollow inside and has in the inside thereof a first inner circumferential surface 63 and a second inner circumferential surface 64 provided stepwise. The first inner circumferential surface 63 is provided with a plurality of convex portions 65 extending toward the center of the jog dial 51 at substantially the same intervals.

Further, an inner surface 52g opposed to the back surface 52b of the casing 52 has tact switches 61a, 61b, and 61c capable of respectively detecting the pressing operations to the jog dial 51 by the user in the A, B, and C directions provided along the second inner circumferential surface 64. The jog dial 51 is capable of moving in the A, B, and C directions according to the pressing operations by the user from the A, B, and C directions, respectively, and the pressing operation is detected by the respective tact switches 61 being pressed against the second inner circumferential surface 64 due to the movement. It should be noted that each of the tact switches 61 is capable of detecting not only a single-click pressing operation of the user, but also a special pressing operation such as a double-click pressing operation or a press-and-hold operation for a predetermined time as a different operation.

The inner surface 52g is also provided with a 2-way switch 62 for detecting the rotating operation to the jog dial 51 in the θ1 and θ2 directions. The 2-way switch 62 is composed of a main body 62a and a stick-type rotary unit 62b capable of turning with the axis in the Z direction in the figure with respect to the main body 62a as the center. When the rotating operation to the jog dial 51 in the θ1 and θ2 directions is performed, the convex portions 65 cause the rotary unit 62b to turn in a pendular state while being brought into contact with the rotary unit 62b of the 2-way switch 62 along with the rotation. The 2-way switch 62 detects the rotating operation of the jog dial 51 by the turn of the rotary unit 62b. It should be noted that in detecting the turn, the user can auditorily recognize a sound generated when the rotary unit 62b is brought into contact with and apart from the convex portions 65, thereby obtaining a mechanical feedback with respect to the rotating operation.

Further, as shown in FIG. 13, the hold switch 53 formed to be stepwise and a stepwise guide groove 66 for slidably guiding the hold switch 53 in the Y direction of the figure are provided between the back surface 52b and the inner surface 52g. In addition, the 2-way switch 62 is connected to the hold switch 53 on the inner surface 52g side so as to enable movement thereof in the Y direction of the figure in an interlocking manner with the slide operation of the hold switch 53. The hold operation of the hold switch 53 will be described later.

It should be noted that the internal structure of the music player 50 other than that described above is substantially the same as the internal structure of the multimedia player 10 according to the first embodiment shown in FIG. 7. However, this embodiment is different from the first embodiment in that the display unit is not provided.

Next, a description will be given of allocation of functions to the respective operations of the jog dial 51 in this embodiment. FIG. 14 is a diagram showing an example of the allocation of functions to be executed by the music player 50 in a case where the pressing operations from the A, B, and C directions and rotating operations in the θ1 and θ2 directions (all of which are shown in FIGS. 10 to 12) are detected.

As shown in the figure, a function of reproducing/stopping a music content (track), for example, is allocated to the pressing operation to the jog dial 51 in the B direction, and functions of reproducing tracks before and after the track currently being reproduced, for example, are allocated to the pressing operations (single-click) in the A and C directions, respectively. It should be noted that in addition to those functions, functions of rewinding and fast-forwarding the track currently being reproduced, for example, may be allocated to the press-and-hold operations in the A and C directions, respectively. Further, functions of turning down and turning up the volume in reproduction of the track are allocated to the rotating operations of the jog dial 51 in the θ1 and θ2 directions, respectively. By the allocation of functions as described above, it is possible to arrange the operation system in a concentrated manner on both side surfaces 52e and 52f and on the upper surface 52c of the casing 52. Moreover, because it is unnecessary to dispose the operation unit on the front surface 52a and back surface 52b of the casing 52, the degree of freedom in design enhances.

It should be noted that in this embodiment, music contents are stored in the flash memory (not shown) in a predetermined reproduction order, for example, and the user can reproduce the tracks in that reproduction order. Further, the CPU (not shown) of the music player 50 may shuffle the reproduction order when power of the music player 50 is turned on or a predetermined operation is performed, for example.

In addition, the allocation of functions is not limited to that shown in FIG. 14, and the functions may be allocated as shown in the examples of FIGS. 15A to 15C, for example. Furthermore, although different functions are respectively allocated to the pressing operations of the jog dial 51 in FIGS. 14 and 15, the same function may be allocated to the operations in two or more directions of the A, B, and C directions.

Next, a description will be given of the hold operation of the rotating operation in the θ1 and θ2 directions in this embodiment.

FIG. 16 are diagrams showing states in the vicinity of the hold switch 53 before and after the hold operation. It should be noted that in the figures, for brevity of description, illustration of the tact switches 61 and the second inner circumferential surface 64 is omitted. FIG. 16A is a front view of the music player 50 showing an internal structure of the jog dial 51 when the hold switch 53 is in an off state, FIG. 16B is a back view of the music player 50 when the hold switch 53 is in the off state, FIG. 16C is a front view of the music player 50 showing the internal structure of the jog dial 51 when the hold switch 53 is in the on state, and FIG. 16D is a back view of the music player 50 when the hold switch 53 is in the on state.

As shown in FIGS. 16A and 16B, in the state where the hold switch 53 is turned off, that is, when the hold switch 53 is positioned at a lower side in the Y direction of the figures, the rotary unit 62b of the 2-way switch 62 is capable of being brought into contact with the convex portions 65 of the jog dial 51, so the rotating operation of the jog dial 51 by the user can therefore be detected.

When the user moves the hold switch 53 by sliding the switch upward in the Y direction from this state as shown in FIGS. 16C and 16D, the rotary unit 62b of the 2-way switch 62 is brought apart from the convex portions 65 of the jog dial 51, whereby the rotary unit 62 does not come into contact with the convex portions 65 even when the jog dial 51 is rotated. Therefore, in this case, the jog dial 51 is idly rotated even when the user rolls the jog dial 51. Thus, the user can easily grasp that the rotating operation is in the hold state by sensing the mechanical change in the feel of operation at the time of performing the rotating operation. It should be noted that when the hold switch 53 is put into the hold state through sliding, an input to the 2-way switch 62 is also regulated electrically to prevent erroneous operations.

Incidentally, as shown in FIGS. 10 and 11, the music player 50 is plane-symmetric with respect to the cross-section a-a' substantially parallel to the right-hand side surface 52e and left-hand side surface 52f of the casing 52 and passes substantially the center of the casing 52, and is plane-symmetric with respect to a cross-section substantially orthogonal to the cross-section a-a' (substantially parallel to the front surface 52a and the back surface 52b) and passes substantially the center of the casing 52. With such shape, it is difficult for the user to distinguish the front surface 52a from the back surface 52b of the music player 50 or vise versa. Therefore, when the user operates the jog dial 51 while the music player 50 is in a bag, pocket, or the like without looking, there are cases where the user erroneously recognizes the front surface 52a and the back surface 52b such that an unintended function is executed even when the user operates the jog dial 51 intentionally for a certain function shown in FIG. 14.

Thus, this embodiment enables the user to arbitrarily define the front and back surfaces 52a and 52b as front and back to reduce erroneous operations. Hereinafter, a description will be given of the definition of the front and back.

Specifically, the definition of front and back is made possible by setting two modes for the allocation of functions to the operations of the jog dial 51, and switching between modes as necessary. FIG. 17 are diagrams illustrating both modes.

As shown in FIG. 17A, a mode 1 is a mode for allocating, regarding the pressing operations to the jog dial 51 in the A, B, and C directions and the rotating operations in the θ1 and θ2 directions, the functions of reproduction of a track that is one track before the currently selected track, reproduction/stop of a track, and reproduction of the next track to the pressing operations in the A, B, and C directions, respectively, and the functions of turning down the volume and turning up the volume to the rotating operations in the θ1 and θ2 directions, respectively, as shown in FIG. 14.

On the other hand, as shown in FIG. 17B, a mode 2 is a mode for allocating the functions of reproduction of the next track, reproduction/stop of a track, and reproduction of a track that is one track before the currently selected track to the pressing operations in the A, B, and C directions, respectively, and the functions of turning up the volume and turning down the volume to the rotating operations in the θ1 and θ2 directions, respectively. It should be noted that in each mode, there is no change in the allocation of the function to the pressing operation from the B direction, and it is only necessary that the functions allocated to the pressing operations from the A and C directions change places and the functions allocated to the rotating operations in the θ1 and θ2 directions change places between the modes 1 and 2.

Figure 18:
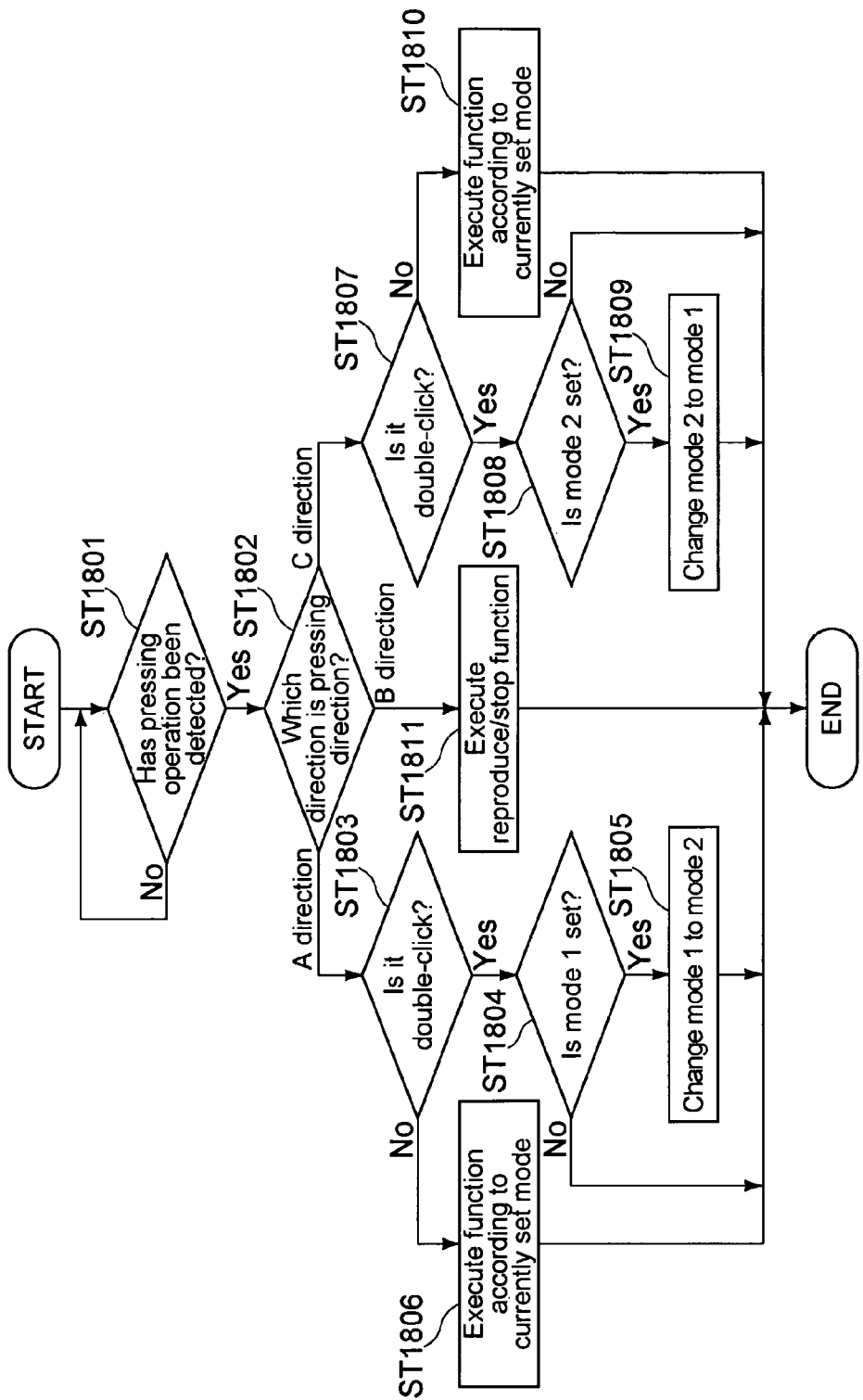
FIG. 18 is a flowchart showing a flow of operations for determining a mode 1 or 2 to define front and back of the music player according to the second embodiment of the present invention.

Next, specific operations for determining the mode to define front and back of the music player 50 will be described. FIG. 18 is a flowchart showing a flow of the operations. It should be noted that in this embodiment, in defining the front and back, the modes 1 and 2 can be switched by the double-click operation to the jog dial 51 from the A or C direction, and definition is made such that the direction from which the double-click operation is made is set as the right-hand side seen from the user.

As shown in the figure, first, upon detection of the pressing operation of the user through the tact switch 61 (Step 1801), the CPU of the music player 50 judges which of the A, B, and C directions the pressing operation has been made from (Step 1802).

When the pressing operation is from the A direction, the CPU judges whether the operation is a double-click operation (Step 1803). When judged as the double-click operation (Yes), the CPU judges whether the mode 1 is currently being executed (Step 1804). When judging that the mode 1 is being executed (Yes), the CPU changes the mode 1 to the mode 2 (Step 1805), and when judging that the mode 2 is being executed (No), keeps the current mode 2 without change.

On the other hand, when it is judged in Step 1803 that the pressing operation from the A direction is a single-click, press-and-hold, or the like and not the double-click, the CPU executes a corresponding function in accordance with the currently set mode (Step 1806).

When it is judged in Step 1802 that the pressing operation is from the C direction, the CPU judges whether the operation is a double-click operation (Step 1807). When judged as the double-click operation (Yes), the CPU judges whether the mode 2 is currently being executed (Step 1808). When judged that the mode 2 is being executed (Yes), the CPU changes the mode 2 to the mode 1 (Step 1809), and when judged that the mode 1 is being executed (No), keeps the current mode 1 without change.

On the other hand, when it is judged in Step 1807 that the pressing operation from the C direction is a single-click, press-and-hold, or the like and not the double-click, the CPU executes a corresponding function in accordance with the currently set mode (Step 1810).

Further, when it is judged in Step 1802 that the pressing operation is from the B direction, the CPU executes the track reproduction/stop function (Step 1811).

By the operations described above, when the user double-clicks the jog dial 51 from the A direction, the left-hand side surface 52f of the casing 52 is defined as an arbitrary right-hand side surface of the user, and when the user double-clicks the jog dial 51 from the C direction, the right-hand side surface 52e of the casing 52 is defined as the arbitrary right-hand side surface of the user. In other words, one of the left-hand side surface 52f and the right-hand side surface 52e that is double-clicked by the user is determined as the arbitrary right-hand side surface of the user, and by allocating functions in accordance therewith, the front and back of the music player 50 can be defined.

Accordingly, not only the case where the user cannot visually distinguish the front surface 52a and the back surface 52b of the music player 50 from each other, but also when the front surface 52a and the back surface 52b cannot be distinguished because the music player 50 is inside the pocket, bag, or the like of the user or because it is dark around, it is possible to operate the jog dial 51 without mistaking the functions allocated thereto.

In addition, by enabling the definition of the front and back of the music player 50, the user becomes capable of operating the music player 50 without being conscious of the front surface 52a and the back surface 52b, and readily operating the music player 50 without having to re-grip the held music player 50 with the other hand.

It should be noted that a function of activating the music player 50 may be allocated to the press-and-hold operations to the jog dial 51 from the A and C directions, and the mode 1 may be set simultaneous with the activation when the press-and-hold operation is performed from the C direction and the mode 2 may be set simultaneous with the activation when the press-and-hold operation is performed from the A direction. Thus, it becomes possible to determine one of the right-hand side surface 52e and the left-hand side surface 52f as the arbitrary right-hand side surface of the user simultaneous with the activation to define front and back, whereby the user becomes capable of readily operating the music player 50 after the activation thereof. Even when the mode is set at the time of activation as described above, the modes 1 and 2 may be switched thereafter by the double-click operation from the A or C direction.

Third Embodiment

Next, a third embodiment of the present invention will be described. In this embodiment, parts having the same structures and functions as in the second embodiment are denoted by the same reference numerals and descriptions thereof will be omitted or simplified. In the music player of this embodiment, a mechanism for holding the rotating operation of the user in the θ1 and θ2 directions is particularly different from that of the second embodiment.

FIG. 19 are diagrams showing states in the vicinity of a hold switch 54 before and after the hold operation of the music player. It should be noted that in the figures, for brevity of description, illustration of the tact switches 61 and the second inner circumferential surface 64 is omitted. FIG. 19A is a front view of the music player 70 showing the internal structure of the jog dial 51 when the hold switch 54 is in the off state, FIG. 19B is a back view of the music player 70 when the hold switch 54 is in the off state, FIG. 19C is a front view of the music player 70 showing the internal structure of the jog dial 51 when the hold switch 54 is in the on state, and FIG. 19D is a back view of the music player 70 when the hold switch 54 is in the on state.

Figure 19A:
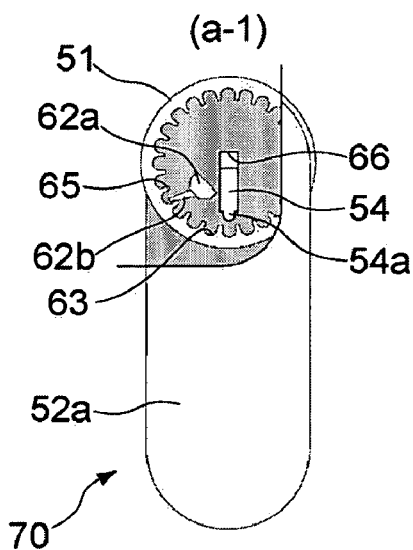
FIG. 19 are diagrams showing states in the vicinity of a hold switch before and after a hold operation according to a third embodiment of the present invention.
Figure 19B:
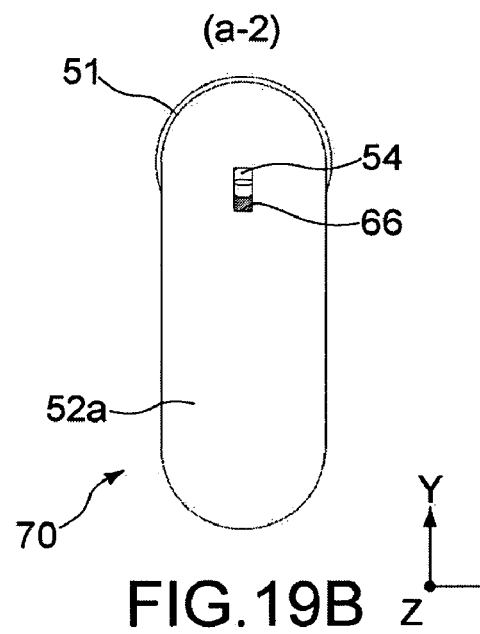

As shown in FIGS. 19A and 19B, the hold switch 54 of this embodiment is slidable in the Y direction of the figures similar to the hold switch 53 of the second embodiment. However, the hold switch 54 and the 2-way switch 62 are provided separately without being connected to each other. Further, the hold switch 54 is provided with an engagement unit 54a capable of engaging between two convex portions 65 of the jog dial 51.

Figure 19C:
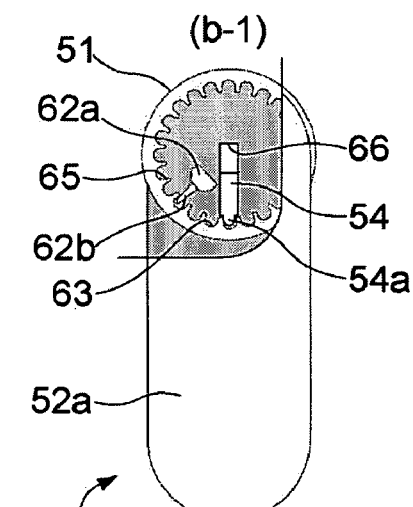
Figure 19D:
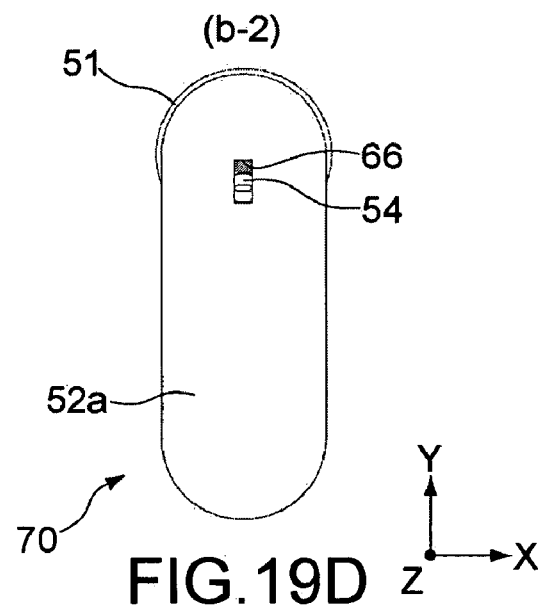

When the user slides the hold switch 54 downward in the Y direction as shown in FIGS. 19C and 19D from the hold-off state shown in FIGS. 19A and 19B, the engagement unit 54a of the hold switch 54 engages between two convex portions 65 to lock the jog dial 51, thereby regulating the rotating operation itself of the jog dial 51 in the θ1 and θ2 directions. Thus, it becomes difficult for the 2-way switch 62 to detect the rotation of the jog dial 51.

Therefore, by sensing the mechanical change in the feel of operation such as the jog dial 51 being locked from rotating, the user can easily grasp that the rotating operation is in the hold state. It should be noted that when the hold switch 54 is put in the hold state through sliding, an input to the 2-way switch 62 is also electrically regulated to prevent erroneous operations.

Fourth Embodiment

Next, a fourth embodiment of the present invention will be described. In this embodiment, parts having the same structures and functions as in the second and third embodiments are denoted by the same reference numerals and descriptions thereof will be omitted or simplified. This embodiment is different from the above embodiments particularly in that not only the detection of the rotating operation of the jog dial, but also the detection of the pressing operation is regulated by the hold switch.

Figure 20:
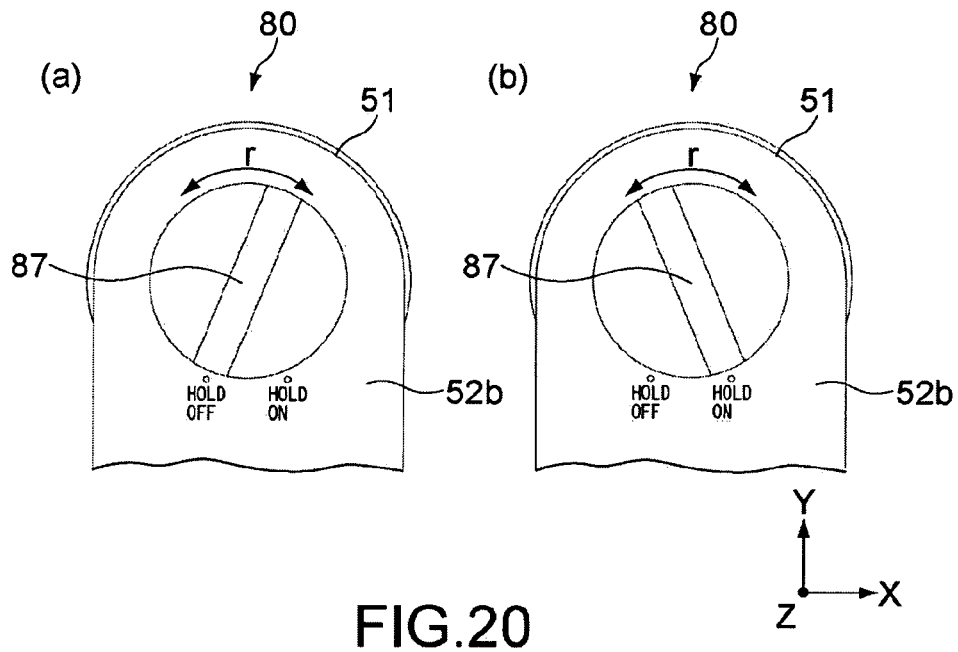
FIG. 20 are back views of a music player in the vicinity of a jog dial according to a fourth embodiment of the present invention.
Figure 21:
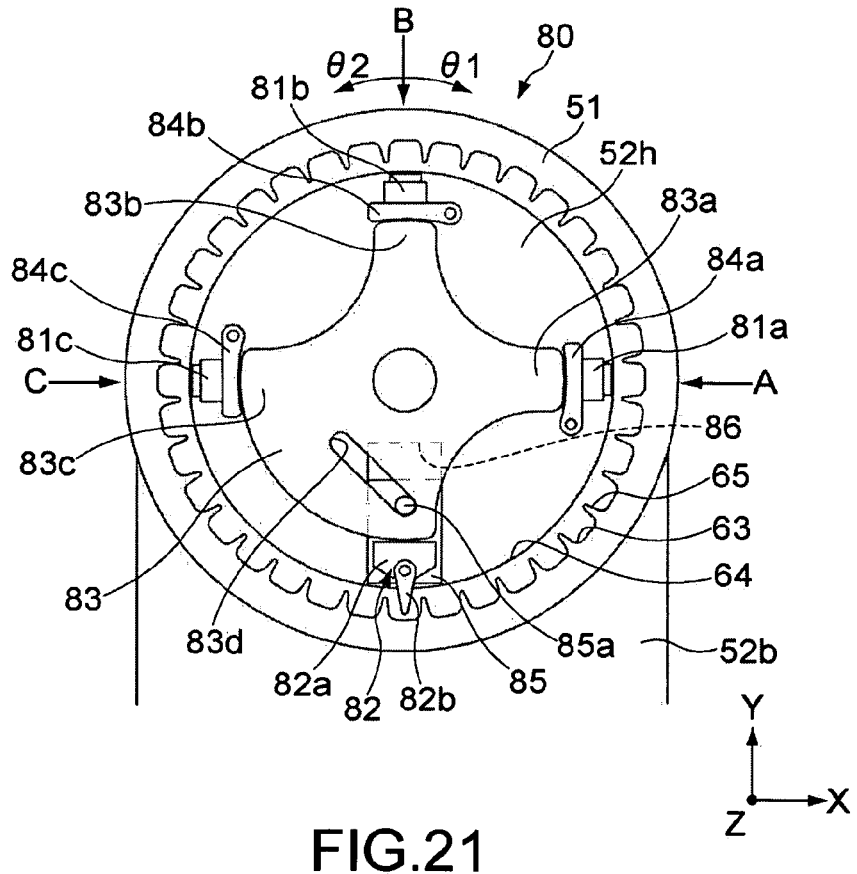
FIG. 21 is a back view showing an internal structure of the music player shown in FIG. 20 in the vicinity of the jog dial.

FIG. 20 are back views of a music player 80 in the vicinity of the jog dial 51 according to this embodiment, and FIG. 21 is a back view showing the internal structure of the music player 80 in the vicinity of the jog dial 51.

As shown in FIG. 20, the back surface 52b of the casing 52 of the music player 80 is provided with a hold switch 87 for holding detection of the rotating and pressing operations of the jog dial 51 at the same time. FIG. 20A shows the hold-off state and FIG. 20B shows the hold-on state. The hold-on state and the hold-off state are switched by the user gripping and turning the hold switch 87 in an r direction indicated in the figures.

FIG. 21 shows the internal structure of the jog dial 51 when the hold switch 87 is in the off state. As shown in the figure, an inner surface 52h opposed to the front surface of the casing 52 is provided with tact switches 81a, 81b, and 81c capable of respectively detecting the pressing operations to the jog dial 51 from the A, B, and C directions, the tact switches being provided along the second inner circumferential surface 64. In addition, the tact switches 81a, 81b, and 81c are connected with elastic plates 84a, 84b, and 84c, respectively. Each of the elastic plates has one end thereof supported by the inner surface 52h, and the elastic plates are capable of elastically deforming in the A, B, and C directions according to the pressing operations by the user from the A, B, and C directions.

A 2-way switch 82 capable of detecting the rotating operations to the jog dial 51 in the θ1 and θ2 directions is disposed on the inner surface 52h at a position opposed to the tact switch 81b. The structure of the 2-way switch 82 is the same as that of the 2-way switch 62 of the second and third embodiments described above. Further, the 2-way switch 82 is connected with a slide plate 85 and the slide plate 85 is capable of sliding in the Y direction by being guided by a guide groove 86 formed on the inner surface 52h in the Y direction.

Furthermore, a rotary plate 83 formed integrally with the hold switch 87 and is capable of rotating along with the rotation of the hold switch 87 in the r direction is provided inside the jog dial 51 at substantially the center thereof. The rotary plate 83 includes support units 83a, 83b, and 83c for respectively supporting the elastic plates 84a, 84b, and 84c connected to the tact switches 81a, 81b, and 81c. In the state where the hold switch 87 is turned off, the support units 83a, 83b, and 83c respectively support the elastic plates 84a, 84b, and 84c so as to sandwich the plates between the respective support units and tact switches 81a, 81b, and 81c against the pressing force from the A, B, and C directions, whereby it becomes possible for the tact switches 81a, 81b, and 81c to respectively detect the pressing operations.

Moreover, the slide plate 85 connected to the 2-way switch 82 is provided with a pin 85a protruding in the Z direction of the figure, and a guide groove 83d capable of guiding the pin 85a while engaged with the pin 85a along with the rotation of the rotary plate 83 is formed in the rotary plate 83. The slide plate 85 is capable of sliding in the Y direction as described above by the pin 85a being guided by the guide groove 83d.

Next, a description will be given of the operations in the music player 80 structured as described above.

Figure 22A:
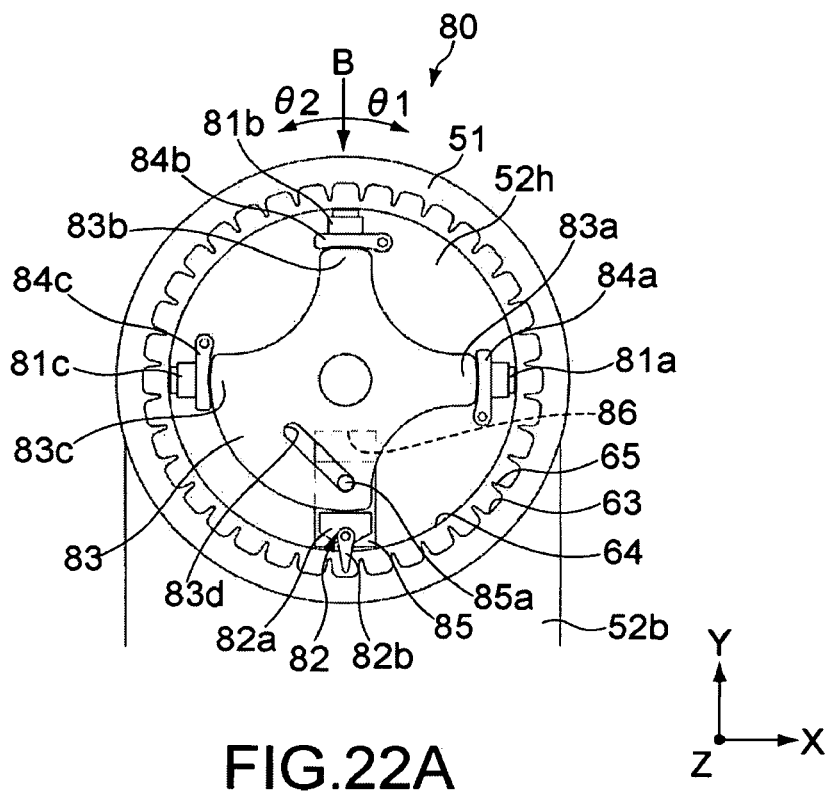
FIG. 22 are back views showing internal states of the jog dial when a hold switch is in an on state according to the fourth embodiment of the present invention.
Figure 22B:
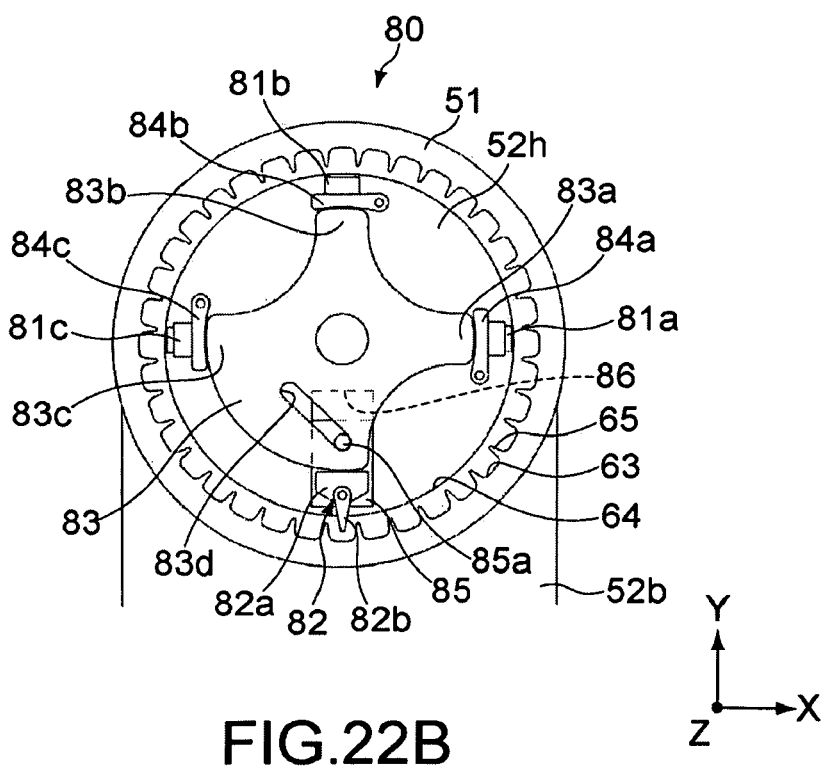

FIG. 22 are back views showing internal states of the jog dial 51 when the hold switch 87 is turned off. As shown in the figures, when the hold switch 87 is turned off (state shown in FIG. 20A), the support units 83a, 83b, and 83c of the rotary plate 83 are respectively supporting the tact switches 81 and the elastic plates 84 as described above. Therefore, when the pressing operation is performed from the B direction, for example, from the state where no operation is performed with respect to the jog dial 51 as shown in FIG. 22A, the tact switch 81b is pressed in the B direction as shown in FIG. 22B, whereby the pressing operation is detected for the predetermined function allocated to that pressing operation to be executed.

Further, when the jog dial 51 is rotated in the θ1 or θ2 direction from the state shown in FIG. 22A, the rotary unit 82b of the 2-way switch 82 turns in a pendular state while being brought into contact with the convex portions 65, whereby the rotating operation is detected for the predetermined function allocated to that rotating operation to be executed.

Figure 23A:
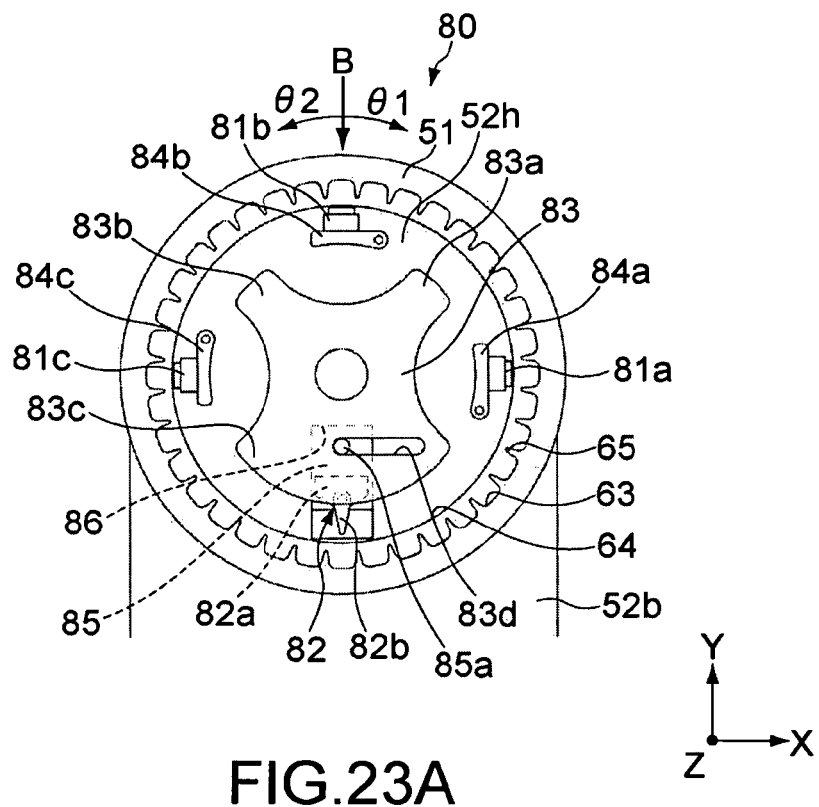
FIG. 23 are back views showing internal states of the jog dial when the hold switch is in an off state according to the fourth embodiment of the present invention.
Figure 23B:
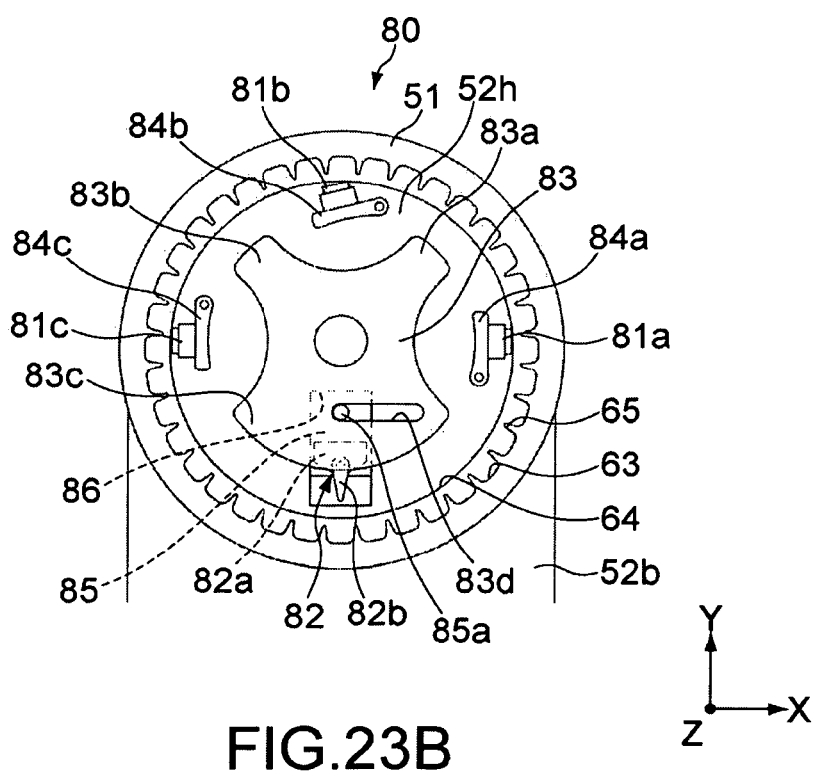

FIG. 23 are back views showing the internal states of the jog dial 51 when the hold switch 87 is turned on. As shown in the figures, when the hold switch 87 is turned on (state shown in FIG. 20B), the rotary plate 83 rotates along with the rotation of the hold switch 87, and the support units 83a, 83b, and 83c of the rotary plate 83 are put in a state where the support units are not supported by the elastic plates 84a, 84b, and 84c. Therefore, in this case, when the jog dial 51 is pressed as shown in FIG. 23B in the B direction, for example, from the state where no operation is performed with respect to the jog dial 51 as shown in FIG. 23A, the pressing force thereof is transferred to the elastic plate 84b via the tact switch 81b to elastically deform the elastic plate 84b by the pressing force in the B direction, and the tact switch 81b also moves in the B direction without being pressed. Thus, the tact switch 81b in this case is put to a state where the tact switch 81b cannot detect the pressing operation.

Moreover, when the hold switch 87 is turned on, the slide plate 85 slides upward in the Y direction by the pin 85a of the slide plate 85 being guided by the guide groove 83d of the rotary plate 83 due to the rotation of the rotary plate 83. Accordingly, the 2-way switch 82 connected to the slide plate 85 also moves upward in the Y direction, whereby the rotary unit 82b of the 2-way switch 82 is brought apart from the convex portions 65 of the jog dial 51 to not come into contact therewith. This is because the guide groove 83d is formed so that an engagement position of the guide groove 83d and the pin 85a comes closer to the center of the rotary plate 83 in the hold-on state than in the hold-off state. Thus, when the jog dial 51 is rotated in the θ1 or θ2 direction from the state shown in FIG. 23A, the jog dial 51 is idly rotated and the 2-way switch 82 therefore cannot detect the rotating operation.

It should be noted that when the hold switch 87 is turned on, inputs to the tact switches 81 and the 2-way switch 82 are also regulated electrically to prevent erroneous operations.

By the above-mentioned operations, it is possible for the user to regulate the detection of the rotating operation and the detection of the pressing operation to the jog dial 51 at the same time with a single mechanism, whereby the number of components can be reduced as compared to the case of regulating both operations by different members, and user convenience is also enhanced.

Fifth Embodiment

Next, a fifth embodiment of the present invention will be described. In this embodiment, parts having the same structures and functions as in the second to fourth embodiments described above are denoted by the same reference numerals and descriptions thereof will be omitted or simplified.

Also in this embodiment, it is possible to hold the detections of the rotating and pressing operations to the jog dial at the same time as in the fourth embodiment, but a mechanism therefor is different.

FIG. 24 are back views of a music player 90 in the vicinity of the jog dial 51 in this embodiment, and FIG. 25 is a sectional view showing main portions of the music player 90 in the side surface direction.

As shown in FIG. 24, the back surface 52b of the music player 90 is provided with a hold switch 91 to enable switching between the hold-on state and the hold-off state by being turned in the r direction similar to the hold switch 87 in the fourth embodiment.

As shown in FIG. 25, an opening 92a is formed on the back surface 52b of the casing 52, and a concave portion 92b is formed on an inner surface 52g opposed to the back surface 52b. The hold switch 91 is composed of a grip portion 91a exposed from the opening 92a on the back surface 52b to be gripped by the user, and a disk portion 91b connected to the grip portion 91a. A male screw 91c is formed on an outer circumference of the disk portion 91b, and the male screw 91c is provided so as to engage with a screw groove 92c formed in the concave portion 92b. Further, the structure of the jog dial 51 is the same as that of the second embodiment except that the 2-way switch 62 is fixed to the inner surface 52h opposed to the front surface 52a of the casing 52.

Figure 26A:
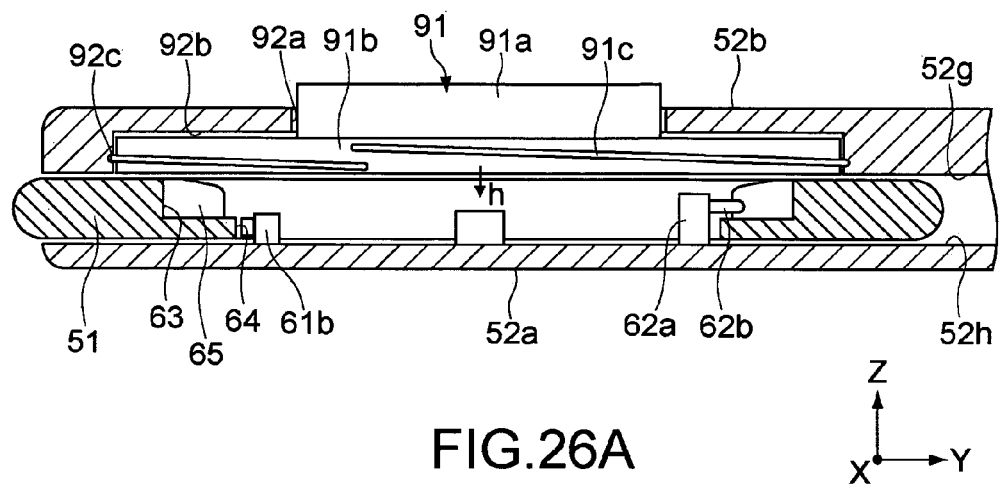
FIG. 26 are sectional views showing principle parts of the music player seen from the side surface direction, in which a hold switch is in an on state and an off state according to the fifth embodiment of the present invention.
Figure 26B:
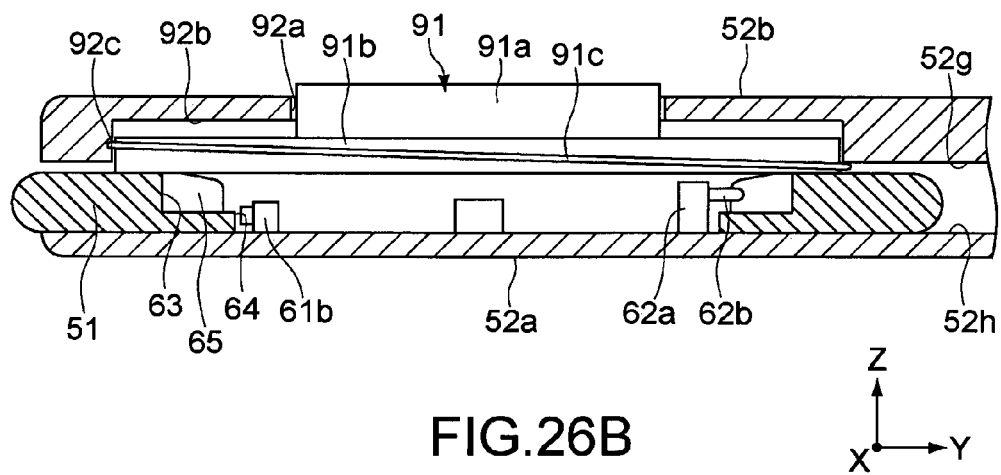

Next, a description will be given of the hold operation of the jog dial 51 in this embodiment. FIG. 26 are sectional views showing main portions of the music player 90 in the side surface direction in cases where the hold switch 91 is turned on and off. FIG. 26A shows the hold-off state and FIG. 26B shows the hold-on state.

As shown in FIG. 26A, in the hold-off state, the tact switches 61 and the 2-way switch 62 inside the jog dial 51 can respectively detect the pressing and rotating operations. When the user turns the hold switch 91 on from this state, as shown in FIG. 26B, the hold switch 91 slightly moves in an h direction indicated by an arrow in the figure (Z direction) by the male screw 91c of the hold switch 91 being guided in the screw groove 92c. Upon the movement, the hold switch 91 presses the jog dial 51 toward the inner surface 52h side to sandwich the jog dial 51 between the hold switch 91 and the inner surface 52h, thereby fixing the jog dial 51. Accordingly, it becomes difficult for the jog dial 51 to move in the Y direction so that the tact switch 61 is pressed, or to be rotated, resulting in a state where the pressing and rotating operations are not detected by the respective tact switches 61 and the 2-way switch 62. It should be noted that when the hold switch 91 is turned on, inputs to the tact switches 61 and the 2-way switch 62 are also regulated electrically to prevent erroneous operations.

By the above-mentioned operations, also in this embodiment, the detections of the rotating and pressing operations to the jog dial 51 can be regulated at the same time as in the fourth embodiment. Further, the user can easily grasp that the jog dial 51 is in a hold state by sensing the change in mechanical feedback in which the jog dial 51 shifts from the state capable of being rotated and pressed to the state incapable of being rotated and pressed.

Sixth Embodiment

Next, a sixth embodiment of the present invention will be described. In this embodiment, parts having the same structures and functions as in the second to fifth embodiments are denoted by the same reference numerals and descriptions thereof will be omitted or simplified.

FIG. 27 are back views of a music player 100 according to this embodiment. As shown in the figures, the back surface 52b of the music player 100 is provided with a concave portion 102 and a mode switching switch 101 capable of sliding in the Y direction in the figures along the concave portion 102. The mode switching switch 101 is a switch for switching the music player 100 between the mode in which reproduction and the like of music contents is performed (hereinafter, referred to as mode 1) as described in the second to fifth embodiments and the mode in which the music player 100 is used as the remote controller (hereinafter, referred to as mode 2). FIG. 27A shows the mode 1 and FIG. 27B shows the mode 2.

Similar to the second to fifth embodiments, reproduction and the like of music contents is performed in the music player 100 in the mode 1. In the mode 2, the music player 100 functions as the remote controller for operating other electronic apparatuses such as a stationary music reproduction apparatus (so-called miniature audio component) present in the vicinity of the music player 100. Although not shown, the music player 100 includes a structure necessary for the remote control, such as an infrared ray transmission unit for transmitting a remote control signal.

When a music content is reproduced in the music player 100 when the user switches the mode to the mode 2 with the mode switching switch 101, the remote control signal is transmitted to the miniature audio component or the like according to the operation to the jog dial 51 to remotely control the miniature audio component or the like after the reproduction is put to pause.

Examples of the functions allocated to the pressing and rotating operations to the jog dial 51 in the mode 2 include those shown in FIG. 28. The allocation of functions is desirably the same as that of the mode 1. Thus, the user is capable of reproducing the music contents in the miniature audio component and the like by the same operation as in reproducing the music contents stored in the music player 100.

As described above, according to this embodiment, by giving the function as the remote controller to the music player 100, it becomes possible to remotely control other electronic apparatuses by a simple operation using the jog dial 51.

Seventh Embodiment

Next, a seventh embodiment of the present invention will be described. In this embodiment, parts having the same structures and functions as in the second to sixth embodiments are denoted by the same reference numerals and descriptions thereof will be omitted or simplified.

FIG. 29 are back views of a music player 150 according to this embodiment. As shown in the figures, the back surface 52b of the music player 150 is provided with, as in the sixth embodiment, a concave portion 152 and a mode switching switch 151 capable of sliding in the Y direction in the figures along the concave portion 152. The mode switching switch 151 is a switch for switching the music player 150 between the mode in which reproduction and the like of music contents is performed (hereinafter, referred to as mode 1) as described in the second to fifth embodiments and the mode in which the music player 150 is used as a file transfer apparatus (hereinafter, referred to as mode 2). FIG. 29A shows the mode 1 and FIG. 29B shows the mode 2.

In the mode 2, it is possible to transfer various files such as a music content stored in the music player 150 to other electronic apparatuses such a PC present in the vicinity of the music player 150, for example. Although not shown, the music player 150 includes, for example, a wireless communication unit for file transfer. It should be noted that the PC as a file transfer destination is installed in advance with a file transfer application for enabling the file transfer by the music player 150.

In a case where the music content is reproduced in the music player 150 when the user switches the mode to the mode 2 with the mode switching switch 151, the reproduction is put to pause. Then, the music player 150 transmits an activation request signal for requesting activation of the file transfer application to the PC or the like. Thus, the music player 150 is put in a state where the various files can be transferred to the PC by operating the file transfer application of the PC or the like through the operation to the jog dial 51.

Examples of the functions allocated to the pressing and rotating operations to the jog dial 51 in transferring the various files include those shown in FIG. 30B. FIG. 30A shows a screen of the file transfer application that is displayed on a display of the PC or the like.

As shown in the figure, when the jog dial 51 is pressed from the A direction, an operation of shifting to a folder on the left side of the designated folder is performed in the file transfer application. For example, when a folder 155c is designated, the designation shifts to the folder 155b on the left. Similarly, when the jog dial 51 is pressed from the C direction, an operation of shifting to a folder on the right side of the designated folder is performed. Further, when the jog dial 51 is pressed from the B direction, a predetermined file is transferred to the designated folder from the music player 150. Furthermore, when the jog dial 51 is rotated in the θ1 or θ2 direction, an operation of moving a cursor 156 in the vertical direction in the designated folder is performed.

As described above, according to this embodiment, by giving the function as the file transfer apparatus to the music player 150, it becomes possible to transfer files to other electronic apparatuses by simple operations using the jog dial 51.

Eighth Embodiment

Next, an eighth embodiment of the present invention will be described.

Figure 31:
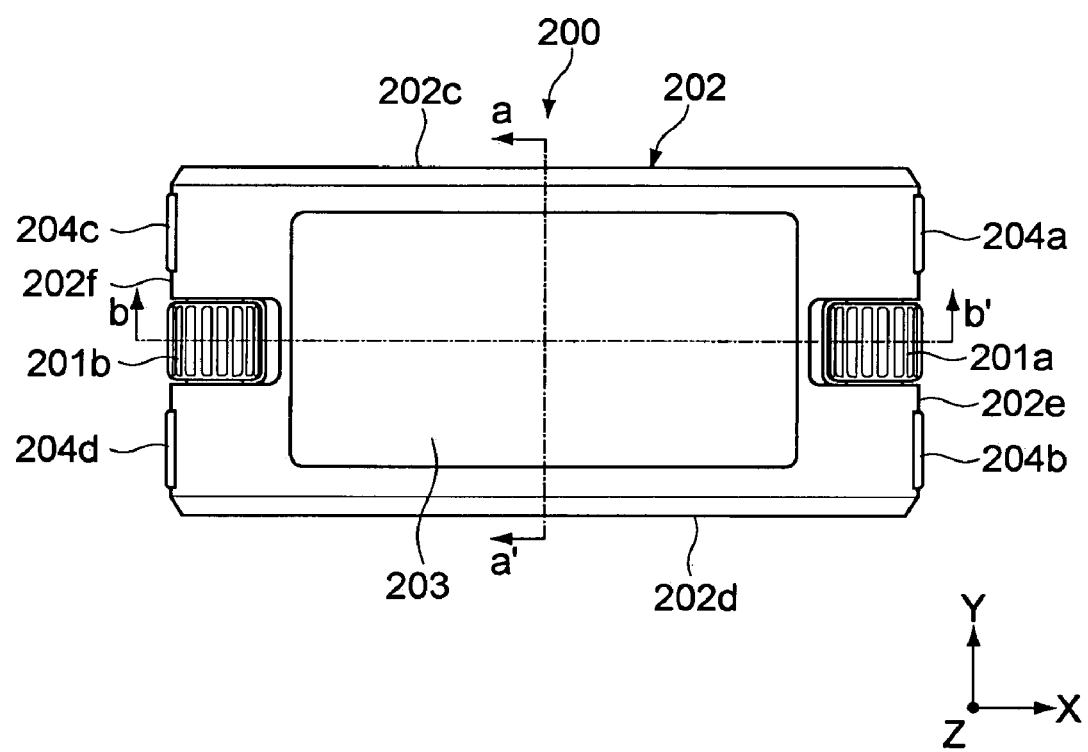
FIG. 31 is a front view showing an outer appearance of a multimedia player according to an eighth embodiment of the present invention.

FIG. 31 is a front view showing an outer appearance of a multimedia player 200 according to this embodiment. As shown in the figure, the multimedia player 200 includes two jog dials similar to the jog dial 1 in the first embodiment, each of which is exposed from three surfaces (first jog dial 201a and second jog dial 201b). A right-hand side surface 202e of a casing 202 has LR buttons 204a and 204b similar to those in the first embodiment provided so as to sandwich the first jog dial 201a, and a left-hand side surface 202f of the casing 202 has LR buttons 204c and 204d provided so as to sandwich the second jog dial 201b. Different functions are respectively allocated to the pressing and rotating operations to the jog dials 201a and 201b and to the pressing operations to the LR buttons 204.

In this embodiment, the user uses the multimedia player 200 with its longitudinal direction (X direction in the figure) as the horizontal direction seen from the user and performs reproduction and the like of, for example, a moving image content by operating both of the jog dials 201a and 201b with both hands.

In addition, the multimedia player 200 is formed to be plane-symmetric with respect to a cross-section a-a' substantially parallel to the right- and left-hand side surfaces 202e and 202f of the casing 202 and passes substantially the center of the casing 202, and plane-symmetric with respect to a cross-section b-b' substantially orthogonal to the cross-section a-a' (substantially parallel to top and bottom surfaces 202c and 202d) and passes substantially the center of the casing 202. With the structure as described above, it is difficult for the user to distinguish the right-hand side surface 202e from the left-hand side surface 202f and vise versa (also the top surface 202c from the bottom surface 202d and vise versa) of the music player 200. Therefore, a function unintended by the user may be executed by the user erroneously recognizing those surfaces.

Thus, this embodiment allows the user to arbitrarily define the right- and left-hand side surfaces 202e and 202f as right- and left-hand directions or vise versa to enable reduction of erroneous operations. Hereinafter, a description will be given on the definition of left and right.

Specifically, two modes are set regarding the allocation of functions to the operations on the jog dials 201a and 201b, and the definition of left and right is enabled by switching between those modes when necessary. In other words, it is possible to arbitrarily make a switch between a mode in which a predetermined first function is allocated to the first jog dial 201a and a predetermined second function is allocated to the second jog dial 201b (mode 1) and a mode in which, in contrast, the second function is allocated to the first jog dial 201a and the first function is allocated to the second jog dial 201b (mode 2). It should be noted that as described above, different functions are respectively allocated to the pressing and rotating operations to the jog dials 201a and 201b and to the pressing operations to the LR buttons 204. However, for convenience of description, a plurality of functions allocated to the jog dial 201a and the LR buttons 204a and 204b and a plurality of functions allocated to the jog dial 201b and the LR buttons 204c and 204d are referred to as first function and second function, respectively.

Figure 32:
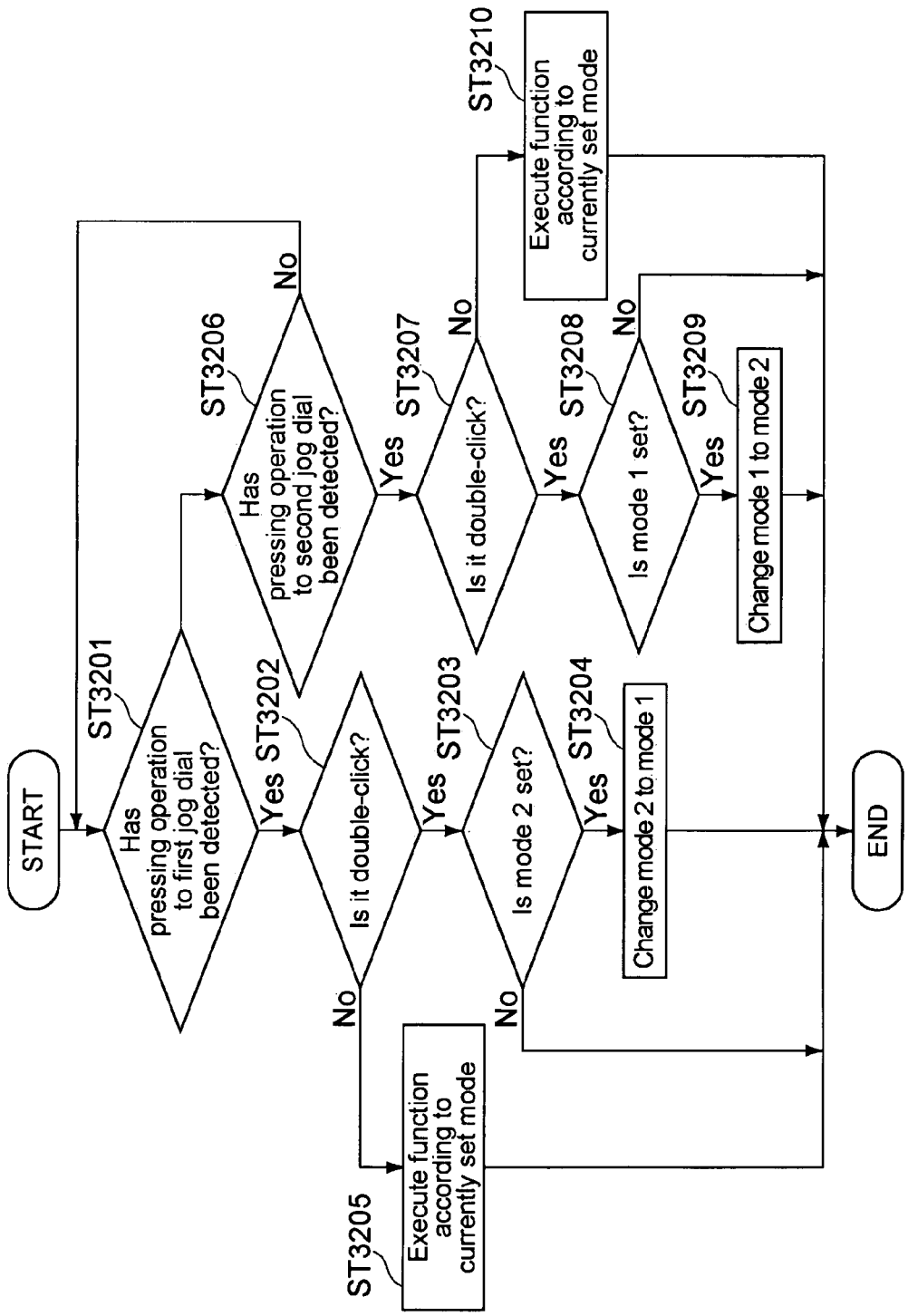
FIG. 32 is a flowchart showing a flow of operations for switching between modes 1 and 2 to define left-hand and right-hand directions of the multimedia player according to the eighth embodiment of the present invention.

FIG. 32 is a flowchart showing a flow of operations for switching between the modes 1 and 2. As shown in the figure, first, a CPU of the multimedia player 200 determines whether a pressing operation to the first jog dial 201a from any of A, B, and C directions has been detected (Step 3201), and if detected (Yes), determines whether the pressing operation is a double-click operation (Step 3202). When determining that the detected pressing operation is the double-click operation (Yes), the CPU determines whether the mode 2 is currently being set (Step 3203), and if the mode 2 is being set (Yes), switches the mode 2 to the mode 1 (Step 3204).

Further, when it is determined in Step 3201 that the pressing operation to the first jog dial 201a has not been detected (No), the CPU determines whether the pressing operation to the second jog dial 201b from any of the directions has been detected (Step 3206), and if detected (Yes), determines whether the pressing operation is the double-click operation (Step 3207). When determining that the detected pressing operation is the double-click operation (Yes), the CPU determines whether the mode 1 is currently being set (Step 3208), and if the mode 1 is being set (Yes), switches the mode 1 to the mode 2 (Step 3209).

When it is determined in Steps 3202 and 3207 that the detected pressing operation is not the double-click operation (No), the CPU executes a function corresponding to the pressing operation from the relevant direction in accordance with the currently set mode.

By the above-mentioned operations, the user becomes capable of arbitrarily defining the horizontal (vertical) direction of the multimedia player 200 by the double-click operation, resulting in enhancement of convenience. It should be noted that the modes may be switched with, for example, a press-and-hold operation as a trigger instead of the double-click operation.

Ninth Embodiment

Figure 33:
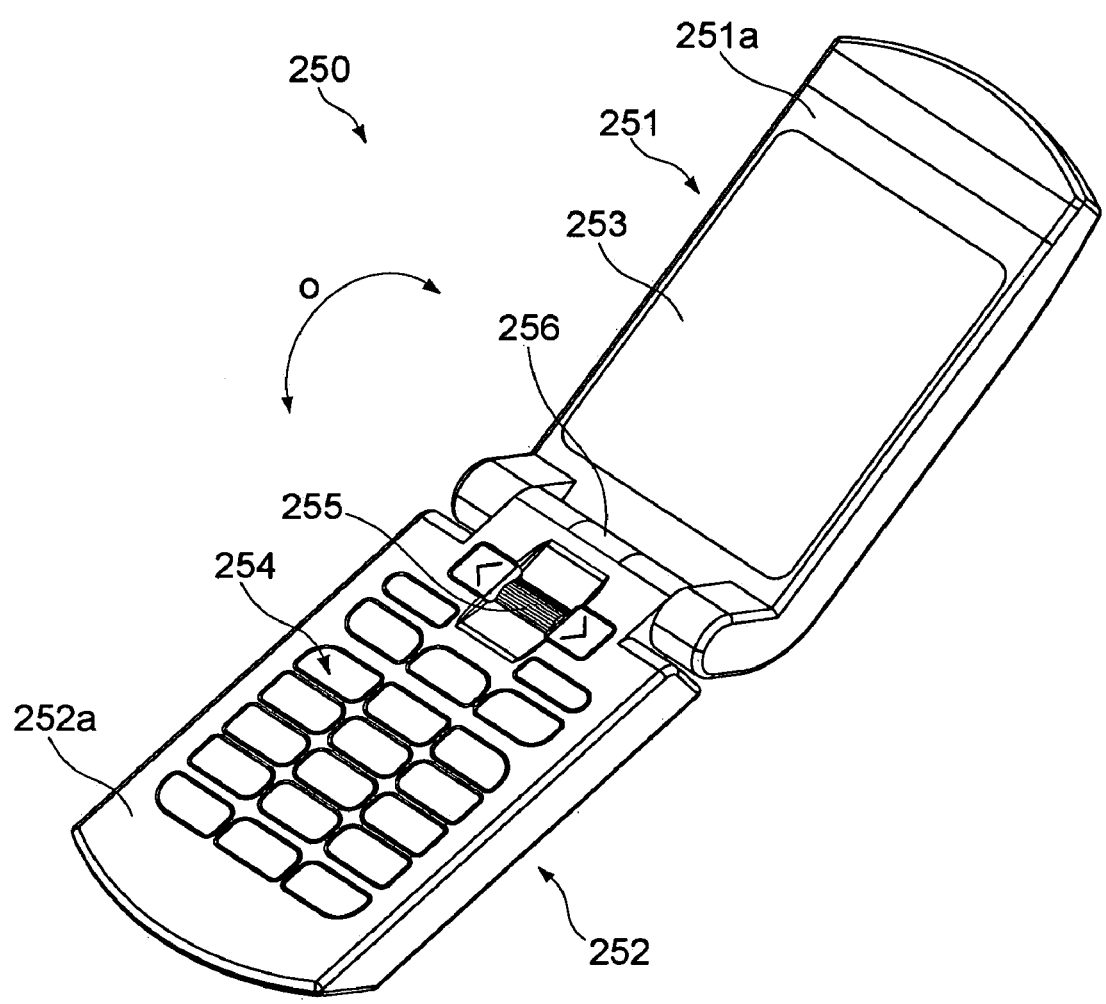
FIG. 33 is a perspective view showing an outer appearance of a cellular phone according to a ninth embodiment of the present invention.

Next, a ninth embodiment of the present invention will be described. In this embodiment, a jog dial is mounted to a cellular phone. FIG. 33 is a perspective view showing an outer appearance of a cellular phone 250.

As shown in the figure, the cellular phone 250 is a so-called folding type cellular phone having a first casing 251 including a main display 253 and a second casing 252 including a keyboard 254 connected via a hinge portion 256 so as to be capable of pivoting (capable of being opened and closed) in an o direction of the figure. The second casing 252 is provided with a jog dial 255 exposed from a front surface 252a.

Figure 34:
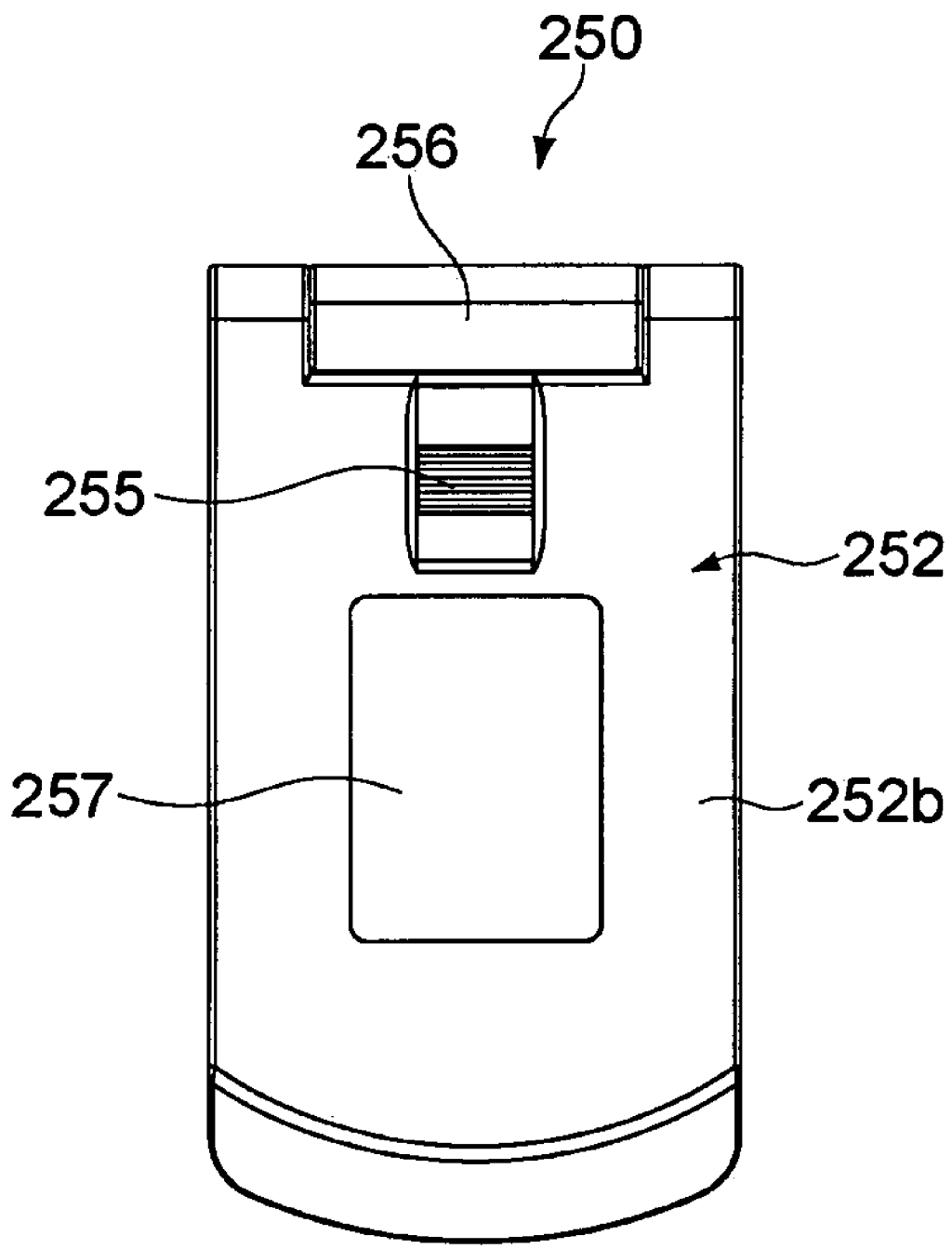
FIG. 34 is a back view of the cellular phone shown in FIG. 33 in a state where the cellular phone is folded.

FIG. 34 is a back view of the cellular phone 250 in a folded state. As shown in the figure, the jog dial 255 is also exposed from the back surface 252b of the second casing 252. Further, the back surface 252b is provided with a sub display 257. By the sub display 257, the user is capable of checking predetermined information such as incoming calls or mail reception even when the cellular phone 250 is folded.

Moreover, by operating the jog dial 255 from the back surface 252b side, the user is capable of processing the predetermined information on the sub display 257. In other words, by using a single jog dial exposed from two surfaces, it becomes possible to perform a predetermined operation without having to open the cellular phone 250 to check the main display 253, resulting in the enhancement of convenience. In this case, it is only necessary that a sensor for detecting an open/close state of the cellular phone 250 be provided and predetermined functions be allocated to the jog dial 255 according to the open/close state. For example, when information indicating a missed call is displayed on the sub display 257, it is possible to dial the phone number of the caller by pressing the jog dial from the back surface 252b side.

The present invention is not limited to the embodiments described above, and it is of course possible to add various modifications insofar as they are within the scope of the present invention.

The exposure direction of the jog dial according to the embodiments of the present invention is not limited to that described and illustrated in the above-mentioned embodiments, and any jog dial may be employed as long as it is exposed from a plurality of surfaces and is capable of being pressed from the plurality of surfaces. In addition, the electronic apparatus mounted with the jog dial is not limited to the above-mentioned multimedia player, music player, and cellular phone, and the jog dial can be mounted to various electronic apparatuses such as a laptop PC, PDA, and game apparatus.

What is claimed is:

1. An electronic apparatus, comprising:
   a casing including a first surface and a second surface;
   a first jog dial exposed from the first surface and the second surface, which is capable of being rotated around a first axis substantially parallel to the first surface and the second surface and is capable of being pressed from a first direction substantially perpendicular to the first surface and a second direction substantially perpendicular to the second surface; and
   a pressing operation detection unit detecting a first pressing operation from the first direction and a second pressing operation from the second direction.

2. The electronic apparatus according to claim 1, further comprising a control unit causing the electronic apparatus to execute a first function when the first pressing operation is detected and execute a second function different from the first function when the second pressing operation is detected.

3. The electronic apparatus according to claim 2, further comprising:
   a transmission unit transmitting a predetermined signal to another apparatus based on a detection by the pressing operation detection unit; and
   a switch unit making a switch between a first mode in which the first function and the second function can be executed and a second mode in which the predetermined signal can be transmitted by the transmission unit.

4. The electronic apparatus according to claim 3,
   wherein the predetermined signal is a signal for remotely controlling the other apparatus so that the other apparatus executes a predetermined function.

5. The electronic apparatus according to claim 3,
   wherein the predetermined signal is a signal related to predetermined content data to be transferred to the other apparatus.

6. The electronic apparatus according to claim 2,
   wherein the first surface and the second surface are opposed to each other,
   wherein the electronic apparatus is formed to be symmetric with respect to a first cross-section substantially parallel to the first surface and the second surface and passes substantially the center of the casing, and formed to be symmetric with respect to a second cross-section substantially orthogonal to the first cross-section and passes substantially the center of the casing,
   wherein the pressing operation detection unit is capable of detecting a third pressing operation different from the first pressing operation from the first direction and a fourth pressing operation different from the second pressing operation from the second direction, and
   wherein the control unit sets a first mode when the third pressing operation is detected and a second mode when the fourth pressing operation is detected,
   the control unit executing the first function when the first pressing operation is detected and the second function when the second pressing operation is detected in the first mode, and
   the control unit executing the second function when the first pressing operation is detected and the first function when the second pressing operation is detected in the second mode.

7. The electronic apparatus according to claim 1,
   wherein the casing includes a third surface,
   wherein the first jog dial is also exposed from the third surface and is capable of being pressed from a third direction substantially perpendicular to the third surface, and
   wherein the pressing operation detection unit is capable of detecting a third pressing operation from the third direction.

8. The electronic apparatus according to claim 1,
   wherein the first surface and the second surface are adjacent to each other, and
   wherein the first jog dial is disposed across an end portion of the first surface to an end portion of the second surface.

9. The electronic apparatus according to claim 8,
   wherein the casing includes a third surface opposed to the second surface and adjacent to the first surface,
   wherein the electronic apparatus further comprises a second jog dial exposed from the first surface and the third surface and is provided across the end portion of the first surface to an end portion of the third surface, which is capable of being rotated around a second axis substantially parallel to the first surface and the third surface and is capable of being pressed from a third direction substantially perpendicular to the third surface and the first direction, and
   wherein the pressing operation detection unit detects a third pressing operation from the first direction and a fourth pressing operation from the third direction with respect to the second jog dial.

10. The electronic apparatus according to claim 9,
    wherein the electronic apparatus is formed to be symmetric with respect to a first cross-section substantially parallel to the second surface and the third surface and passes substantially the center of the casing, and formed to be symmetric with respect to a second cross-section substantially orthogonal to the first cross-section, passes substantially the center of the casing, and is substantially perpendicular to the first axis and the second axis, and
    wherein the pressing operation detection unit is capable of detecting a fifth pressing operation from the first direction with respect to the first jog dial, which is different from the first pressing operation, a sixth pressing operation from the second direction with respect to the first jog dial, which is different from the second pressing operation, a seventh pressing operation from the first direction with respect to the second jog dial, which is different from the third pressing operation, and an eighth pressing operation from the third direction with respect to the second jog dial, which is different from the fourth pressing operation,
    the electronic apparatus further comprising a control unit setting a first mode when one of the fifth pressing operation and the sixth pressing operation is detected and setting a second mode when one of the seventh pressing operation and the eighth pressing operation is detected,
    in the first mode, a first function being executed when the first pressing operation is detected, a second function being executed when the second pressing operation is detected, a third function being executed when the third pressing operation is detected, and a fourth function being executed when the fourth pressing operation is detected,
    in the second mode, the third function being executed when the first pressing operation is detected, the fourth function being executed when the second pressing operation is detected, the first function being executed when the third pressing operation is detected, and the second function being executed when the fourth pressing operation is detected.

11. The electronic apparatus according to claim 1, further comprising:
   a first display unit provided on the first surface; and
   a second display unit provided on the second surface,
   wherein the first surface and the second surface are opposed to each other.

12. The electronic apparatus according to claim 1, further comprising:
   a rotating operation detection unit detecting a rotating operation; and
   a regulation unit regulating detection by the rotating operation detection unit.

13. The electronic apparatus according to claim 12,
   wherein the first jog dial is hollow inside and has a plurality of convex portions formed along an inner surface thereof,
   wherein the rotating operation detection unit includes a rotary switch capable of turning in a pendular state by being brought into contact with the plurality of convex portions along with the rotating operation, and
   wherein the regulation unit includes
      an engagement unit formed to be capable of engaging with the plurality of convex portions, and
      a movable unit regulating the rotating operation by moving the engagement unit in a rotating radial direction of the first jog dial so that the engagement unit engages with the convex portions.

14. The electronic apparatus according to claim 12,
   wherein the first jog dial is hollow inside and has a plurality of convex portions formed along an inner surface thereof,
   wherein the rotating operation detection unit includes a rotary switch capable of turning in a pendular state by being brought into contact with the plurality of convex portions along with the rotating operation, and
   wherein the regulation unit includes a movable unit regulating detection of the rotating operation by moving the rotary switch in a rotating radial direction of the first jog dial so that the rotary switch is not brought into contact with the plurality of convex portions.

15. The electronic apparatus according to claim 12,
   wherein the regulation unit regulates detection by the pressing operation detection unit while regulating detection by the rotating operation detection unit.

16. The electronic apparatus according to claim 15,
   wherein the first jog dial is hollow inside and has a plurality of convex portions formed along an inner surface thereof,
   wherein the rotating operation detection unit includes a rotary switch capable of turning in a pendular state by being brought into contact with the plurality of convex portions along with the rotating operation,
   wherein the pressing operation detection unit includes a first pressing switch detecting the first pressing operation and a second pressing switch detecting the second pressing operation, and
   wherein the regulation unit includes
      a first retention member that retains the first pressing switch and is movable in the first direction by a first pressing force of the first pressing operation at a time of detection regulation,
      a second retention member that retains the second pressing switch and is movable in the second direction by a second pressing force of the second pressing operation at the time of the detection regulation,
      a movable unit that retains the rotary switch and has a protrusion protruding in the first axial direction, and is movable in a rotating radial direction of the first jog dial, and
      a rotary member provided inside the first jog dial, which is rotatable around the first axis and includes
         a first support unit which makes detection possible by regulating a movement of the first pressing switch by supporting the first retention member from a third direction opposite to the first direction at a time of non-detection regulation, and releases the support from the third direction by a rotation at the time of the detection regulation,
         a second support unit which makes detection possible by regulating a movement of the second pressing switch by supporting the second retention member from a fourth direction opposite to the second direction at the time of the non-detection regulation, and releases the support from the fourth direction by the rotation at the time of the detection regulation, and
         a guide groove engaged with the protrusion and guides the protrusion by the rotation at the time of the detection regulation to enable the movable unit to move so that the rotary switch is not brought into contact with the plurality of convex portions.

17. The electronic apparatus according to claim 15,
   wherein the casing includes
      a third surface adjacent to the first surface and the second surface,
      a fourth surface opposed to the third surface and adjacent to the first surface and the second surface,
      a first inner surface opposed to the third surface, and
      a second inner surface opposed to the fourth surface and the first inner surface,
   wherein the first jog dial is provided between the first inner surface and the second inner surface, and
   wherein the regulation unit includes a fixation unit provided between the first inner surface and the first jog dial and is movable in a direction of the first axis, which fixes the first jog dial such that the first jog dial is sandwiched between the fixation unit and the second inner surface in a manner that disables the rotating operation and the first and second pressing operations with respect to the first jog dial, by causing the first jog dial to move in the direction of the first axis to the second inner surface side at a time of detection regulation.

18. The electronic apparatus according to claim 1,
   wherein the first jog dial is provided independent of the casing to be incommunicable with an inner portion of the casing.

* * * * *